United States Patent
Chen et al.

(10) Patent No.: US 11,150,098 B2
(45) Date of Patent: *Oct. 19, 2021

(54) DYNAMICALLY DETERMINING ORIGIN AND DESTINATION LOCATIONS FOR A NETWORK SYSTEM

(71) Applicant: Uber Technologies, Inc., San Francisco, CA (US)

(72) Inventors: Qi Chen, Sunnyvale, CA (US); Casey Lawler, El Cerrito, CA (US); Linfeng Shi, San Francisco, CA (US); Qing Xu, Santa Clara, CA (US); Miao Yu, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 227 days.

This patent is subject to a terminal disclaimer.

(21) Appl. No.: 16/409,636

(22) Filed: May 10, 2019

(65) Prior Publication Data
US 2019/0265055 A1  Aug. 29, 2019

Related U.S. Application Data

(63) Continuation of application No. 15/662,407, filed on Jul. 28, 2017, now Pat. No. 10,330,482.

(51) Int. Cl.
*G01C 21/34* (2006.01)
*G06Q 10/04* (2012.01)
(Continued)

(52) U.S. Cl.
CPC ..... *G01C 21/3438* (2013.01); *G01C 21/3415* (2013.01); *G01C 21/362* (2013.01);
(Continued)

(58) Field of Classification Search
CPC ............ G01C 21/3438; G01C 21/3415; G01C 21/362; G06Q 10/06315; G06Q 50/30
See application file for complete search history.

(56) References Cited

U.S. PATENT DOCUMENTS

| | | |
|---|---|---|
| 9,562,785 B1 | 2/2017 | Racah et al. |
| 2004/0167715 A1 | 8/2004 | Miwa |

(Continued)

FOREIGN PATENT DOCUMENTS

| | | |
|---|---|---|
| EP | 1939590 A1 | 7/2008 |
| KR | 10-2015-0069843 A | 6/2015 |

OTHER PUBLICATIONS

International Search Report and Written Opinion received for PCT Patent Application No. PCT/IB2018/055424, dated Nov. 9, 2018, 7 pages.

*Primary Examiner* — Michael D Lang
(74) *Attorney, Agent, or Firm* — Fenwick & West LLP

(57) ABSTRACT

A network system dynamically determines a route, including start and end points, for vehicles in a transportation network. The transportation network receives a service request from a user of the transportation network including an origin location for the trip and a destination location for the trip. The transportation network then generates a waypoint plan for one or more vehicles, which includes the requested origin and destination in addition to any previously requested origins and destinations included in the vehicles current route. The network system then determines a directionality for each of the waypoints in the waypoint plan and retrieves candidate start and end points that have an associated directionality within a threshold angle of the directionality of each waypoint and are proximate to the waypoint. The network system evaluates each combination of retrieved candidate points to select a route for the vehicle.

20 Claims, 23 Drawing Sheets

(51) Int. Cl.
    *G06Q 10/02*     (2012.01)
    *G01C 21/36*     (2006.01)
    *G06Q 10/06*     (2012.01)
    *G06Q 50/30*     (2012.01)

(52) U.S. Cl.
    CPC ........... *G06Q 10/02* (2013.01); *G06Q 10/047* (2013.01); *G06Q 10/06315* (2013.01); *G06Q 50/30* (2013.01)

(56) References Cited

U.S. PATENT DOCUMENTS

2016/0320198 A1    11/2016   Liu et al.
2016/0364678 A1    12/2016   Cao

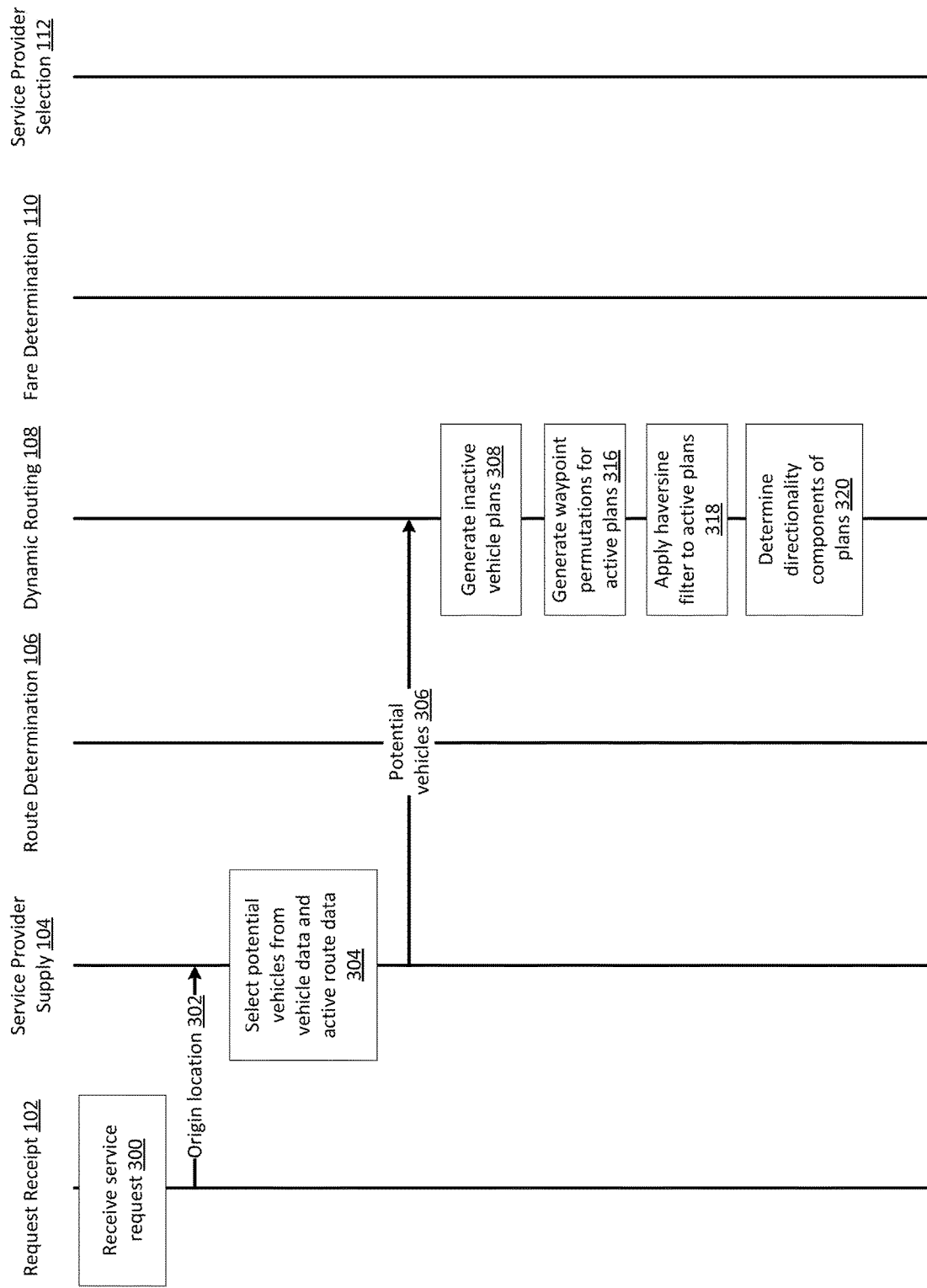
Fig. 3A (continued in 3B)

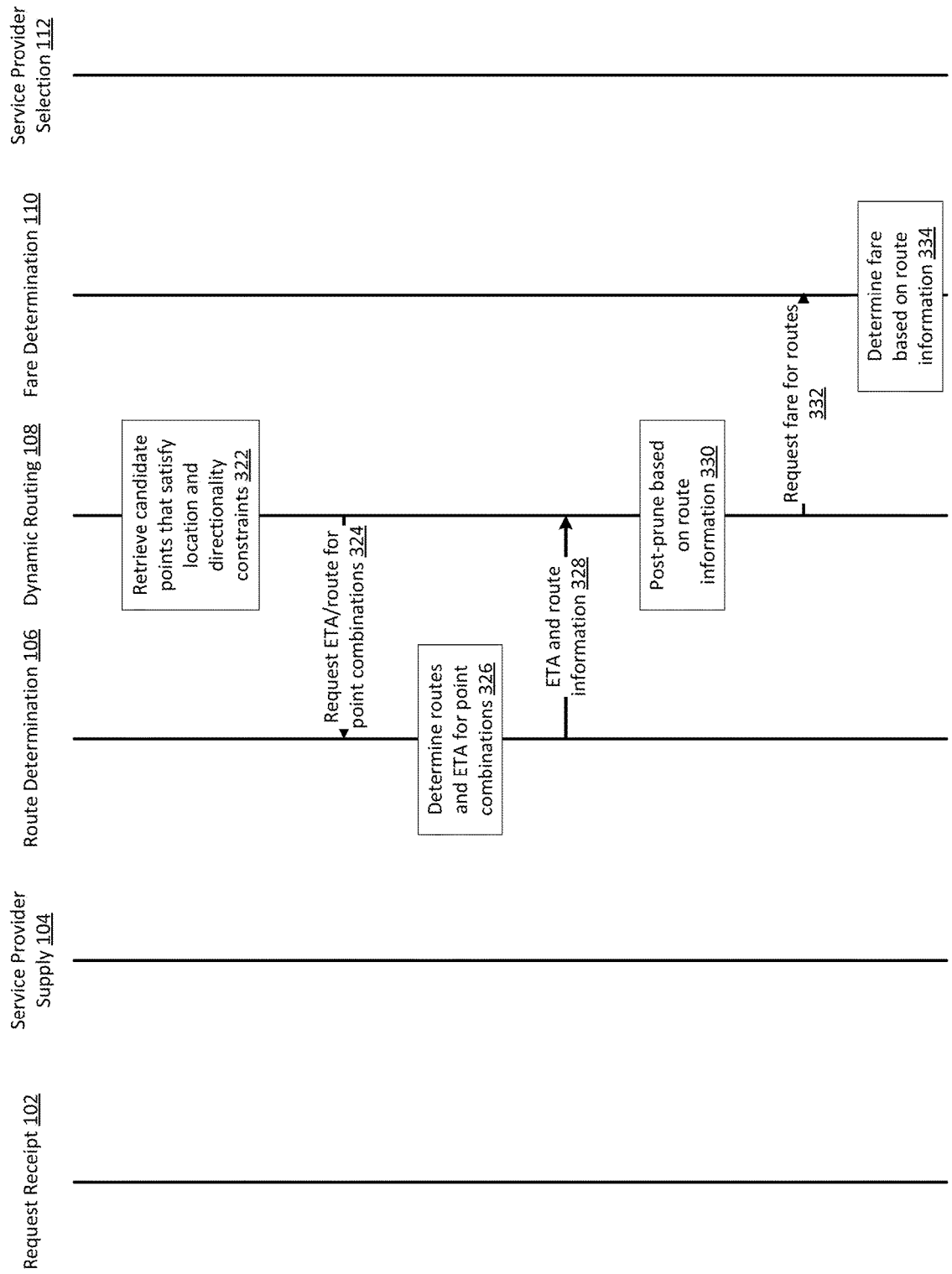
Fig. 3B (continued in 3C)

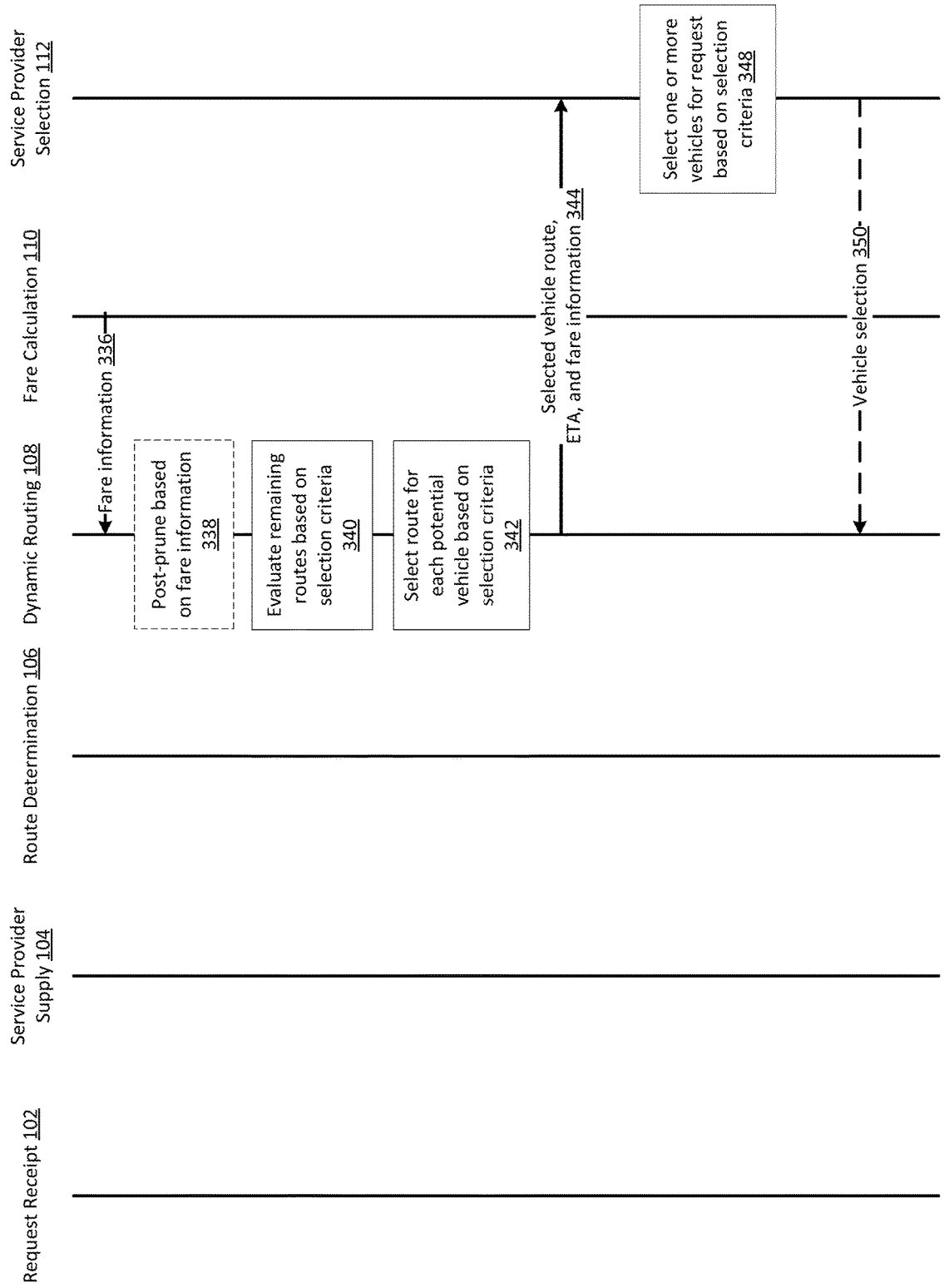
Fig. 3C (continued in 3D)

| Waypoint Permutations |
|---|
| 600A -> 600B -> 602A -> 602B |
| 600A -> 600B -> 602B -> 602A |
| 600A -> 602A -> 600B -> 602B |
| 600A -> 602A -> 602B -> 600B |
| 600A -> 602B -> 600B -> 602A |
| 600A -> 602B -> 602A -> 600B |
| 600B -> 600A -> 602A -> 602B |
| 600B -> 600A -> 602B -> 602A |
| 600B -> 602A -> 600A -> 602B |
| 600B -> 602A -> 602B -> 600A |
| 600B -> 602B -> 600A -> 602A |
| 600B -> 602B -> 602A -> 600A |
| 602A -> 600A -> 600B -> 602B |
| 602A -> 600A -> 602B -> 600B |
| 602A -> 600B -> 600A -> 602B |
| 602A -> 600B -> 602B -> 600A |
| 602A -> 602B -> 600A -> 600B |
| 602A -> 602B -> 600B -> 600A |
| 602B -> 600A -> 600B -> 602A |
| 602B -> 600A -> 602A -> 600B |
| 602B -> 600B -> 600A -> 602A |
| 602B -> 600B -> 602A -> 600A |
| 602B -> 602A -> 600A -> 600B |
| 602B -> 602A -> 600B -> 600A |

| Waypoint Configurations |
|---|
| 600A -> 600B -> 602A -> 602B |
| 600A -> 600B -> 602B -> 602A |
| 600A -> 602A -> 600B -> 602B |
| 600A -> 602A -> 602B -> 600B |
| 600A -> 602B -> 600B -> 602A |
| 600A -> 602B -> 602A -> 600B |
| 600B -> 600A -> 602A -> 602B |
| 600B -> 600A -> 602B -> 602A |
| 600B -> 602A -> 600A -> 602B |
| 600B -> 602A -> 602B -> 600A |
| 600B -> 602B -> 600A -> 602A |
| 600B -> 602B -> 602A -> 600A |
| 602A -> 600A -> 600B -> 602B |
| 602A -> 600A -> 602B -> 600B |
| 602A -> 600B -> 600A -> 602B |
| 602A -> 600B -> 602B -> 600A |
| 602A -> 602B -> 600A -> 600B |
| 602A -> 602B -> 600B -> 600A |
| 602B -> 600A -> 600B -> 602A |
| 602B -> 600A -> 602A -> 600B |
| 602B -> 600B -> 600A -> 602A |
| 602B -> 600B -> 602A -> 600A |
| 602B -> 602A -> 600A -> 600B |
| 602B -> 602A -> 600B -> 600A |

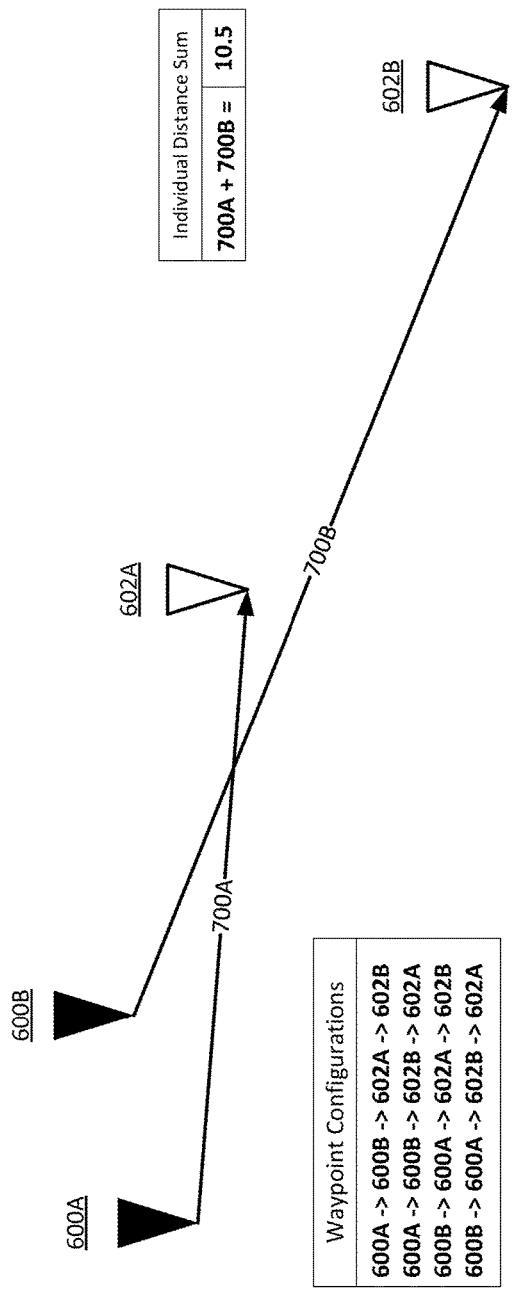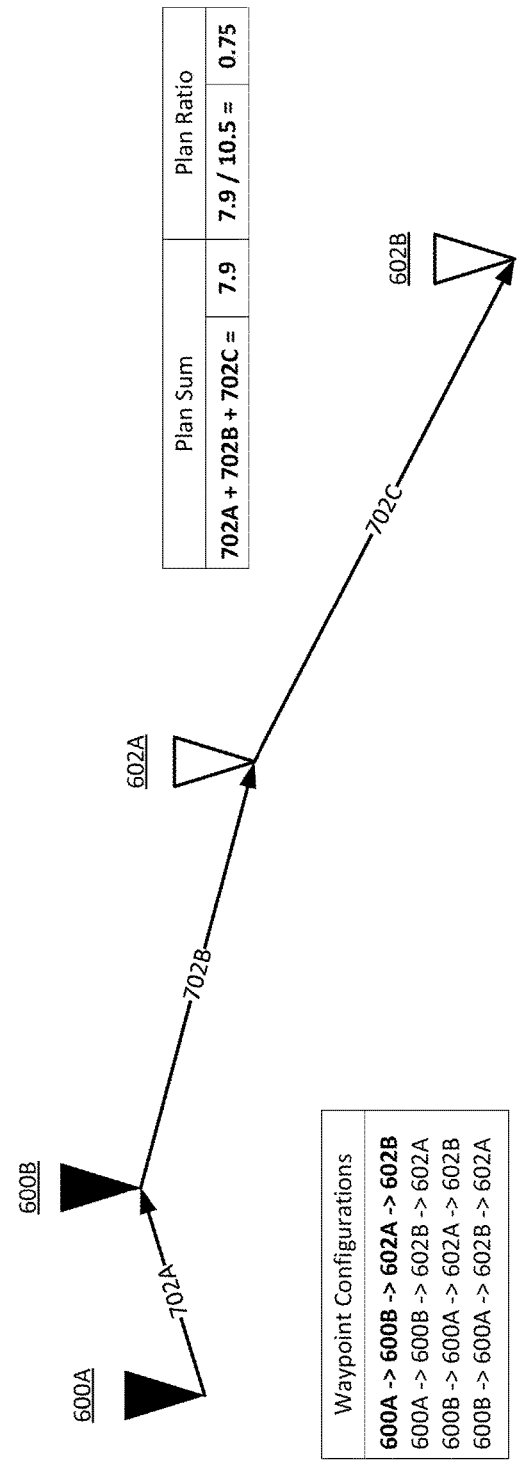
Fig. 7A
Fig. 7B

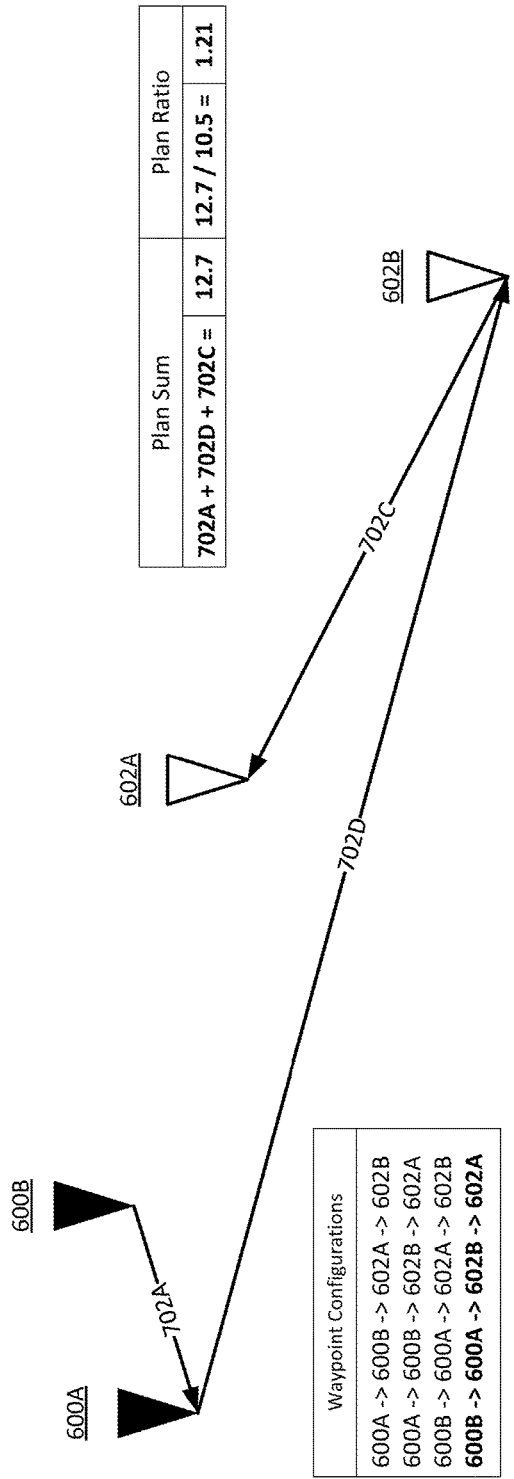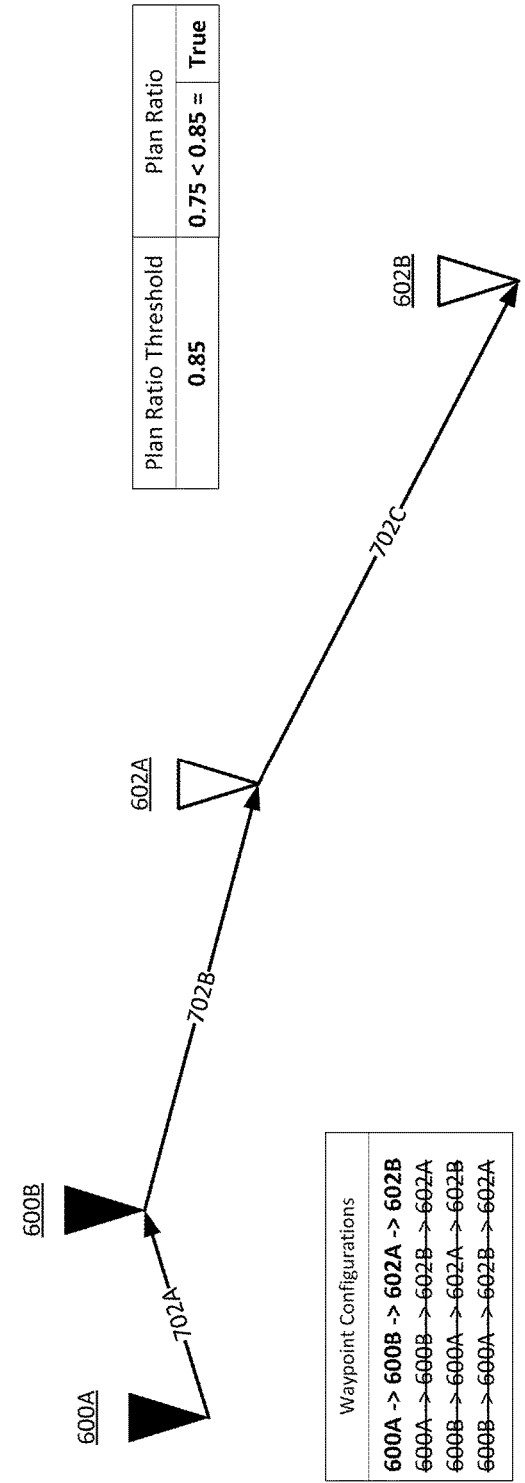

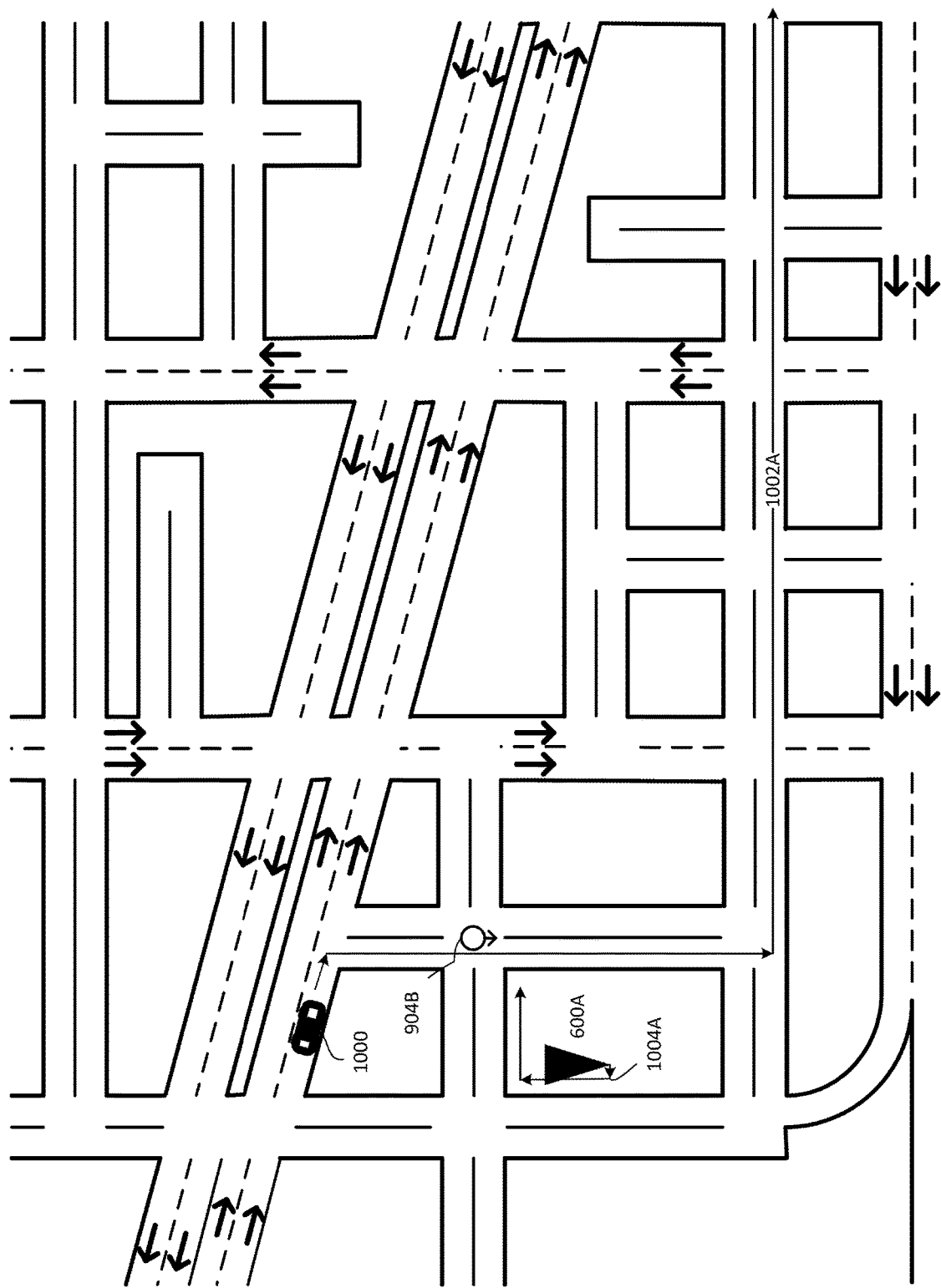

DYNAMICALLY DETERMINING ORIGIN AND DESTINATION LOCATIONS FOR A NETWORK SYSTEM

CROSS-REFERENCE TO RELATED APPLICATIONS

This application is a continuation of U.S. patent application Ser. No. 15/662,407, filed Jul. 28, 2017, which is incorporated by reference herein.

BACKGROUND

Field

The described embodiments relate generally to providing vehicle routing guidance to dynamically determined start and end locations, and more particularly to selecting a vehicle and route based on the dynamically determined points.

Description of Related Art

On-demand network systems allow users to request services from one location to another, such as transportation of people or delivery of an object from an origin location to a destination location. A network system typically selects a vehicle from amongst a network of vehicles to transport a requesting user or a requested object from the origin location to the destination location. Typically, one or more vehicles are selected to provide services based on the relative location of the vehicles to the origin location of the request or based on a current route of a vehicle that is proximate to the origin location and destination location. A network system may then determine a new route that includes a path from the requested origin location to the requested destination location.

Typically, network systems provide the selected vehicle with a reported GPS location of the user, a street address proximate to the requested origin location, or a street address provided to the user so that the vehicle may locate the user or requested object for pick up. The end location is typically provided to the vehicle in a similar manner. Depending on the start and end locations provided to the vehicle, the vehicle may encounter significant delays during service between the start and end locations based on the surrounding road topology, traffic conditions, safety concerns, or other factors.

SUMMARY

Described embodiments enable the dynamic determination of start (e.g., a pick up location) and end (e.g., a drop off location) locations by an on-demand network system. The network system (e.g., a system for arranging transportation services) determines origin and destination locations for a trip or delivery requested by a user. In a passenger transportation system, a user may submit a request for a vehicle to transport her and/or one or more other passengers from a requested origin to a requested destination. In an object delivery transportation system, a user may submit a request to transport an object from a requested origin to a requested destination. For ease of explanation, the term "service" or "requested service" is used throughout and may indicate a service for one or more passengers or the delivery of one or more objects, depending on the embodiment.

To accommodate service requests from users, the network system is in communication with a number of vehicles constituting a network distributed over an operational area. The vehicles may have human operators or "drivers" or they may be autonomously operated. Depending on the embodiment, the vehicles may be automobiles, delivery trucks, VTOL aircraft, or any other vehicle capable of transporting people or goods. In embodiments where the vehicle is operated by a driver, the network system may communicate with the driver using a mobile device connected to a wireless network, such as the Internet or any other telecommunication network, or may communicate directly with the vehicle. In some embodiments, the mobile device is a smartphone with an application for drivers of the network system installed on the smartphone. In embodiments that include autonomous vehicles, the network system may communicate with the vehicles directly using a telecommunications network. The service providers in the network also provide their GPS location to the network system. The network system monitors the status of each vehicle in the network and stores route information for vehicles providing services to users.

The network system provides means for users to submit service requests to the system. In some embodiments, a user may use a mobile computation device, such as a smartphone, with an application provided by the network system installed on the smartphone to submit service requests to the network system. A service request may include global coordinates, a GPS location, or a geocoded address, for both an origin location and a destination location specified by the requesting user. In some embodiments, vehicles that are currently fulfilling a service request or accommodating a previous request may be rerouted to accommodate an additional service request in order to improve the efficiency of the network system by better utilizing the vehicles available in the network. Service providers (e.g., drivers in the network system or autonomous vehicles) accommodating another service request at the time of receiving a service request are referred to herein as "active service providers" or "active vehicles," while service providers that are not accommodating a request are referred to herein as "inactive service providers," or "inactive vehicles." Thus, a service request may include a parameter indicating whether or not active service providers may be used to satisfy the request. Additional information in a service request may include a maximum distance from the service provider's location to the start location, a maximum distance from the end location to the requested destination, a number of passengers requesting a service, the type of vehicle being requested, order or delivery details, special instructions, or any other information that may be useful in providing services to a user.

Upon receiving a service request from a user, the network system determines a set of potential service providers that may be able to accommodate the service request. Service providers may be both active and inactive, exclusively active, or exclusively inactive depending on the service request. In some embodiments, the network system uses the service provider supply engine and service provider data to identify service providers within a threshold distance or within a threshold estimated time of arrival (ETA) to the requested origin. In some embodiments, the service provider supply engine may utilize active route data to identify active service providers that have an associated route that comes within a threshold distance or within a threshold ETA of the requested origin. The supply engine may identify potential service provider up to a maximum number of potential service providers.

Once a set of potential service providers have been selected, the network system transfers the potential service provider data to the dynamic routing engine for processing. The dynamic route engine determines a route for each potential service provider and determines start and end points located near the requested origin location and destination location for the determined route. To accomplish this, the dynamic route engine generates plans based on waypoints for the requested origin and destination locations and, in the case of an active service provider, additional waypoints for the previously requested origin and destination locations included in the active route for the active service provider. A single plan is generated for an inactive service provider, as there is only one acceptable permutation of a two waypoint plan (going to a requested destination before a requested origin is unacceptable). For active service providers, there may be multiple acceptable permutations of waypoints to be evaluated by the dynamic routing engine because multiple service requests are being accommodated by the same service provider. Therefore, the dynamic routing engine generates all acceptable waypoint permutations for each active service provider.

The dynamic routing engine further reduces the number of possible waypoint permutations by applying a haversine ratio filter on the waypoint permutations. The haversine ratio filter is applied to waypoint permutations for active service providers that, with the addition of the new service request, would be satisfying multiple service requests. The dynamic routing engine first determines the sum of the haversine distances between the origin and destination waypoints for each service request of the active service provider. The dynamic routing engine then determines the sum of the haversine distances from each waypoint to the next waypoint in the permutation. The dynamic routing engine then calculates a ratio of each permutation distance to the individual distances and eliminates all permutations that do not have an associated ratio less than a threshold fraction of the individual distance sum.

Once acceptable waypoint plans have been generated for each service provider, the dynamic routing engine determines the directionality components of each plan. Directionality may be determined based on the heading angle between a waypoint and the next waypoint in the plan. Thus, each waypoint except for the last waypoint in a place has an associated directionality. After each eligible waypoint in each plan has been associated with a directionality, the dynamic drop off system retrieves candidate points (either start or end locations depending on the designation of the associated waypoint) for each waypoint in each plan. The dynamic routing engine retrieves the candidate points from the candidate point data stored by the network system. Candidate points may be curated manually by administrators of the network system, curated through empirical data on past service requests received by the network system, and/or automatically generated based on topographical maps of the area. Candidate points may be designated by intersection, by intersection corner, by road segment, or by exact GPS location. Additionally, candidate points may be associated with a direction based on the direction of the roads adjacent to or intersecting the candidate point. For example, if a candidate point is located at an intersection of a northbound and a westbound road the candidate point may be associated with the northern and western cardinal directions.

The dynamic routing engine retrieves candidate points for each waypoint in each plan that satisfy location and directionality constraints relative to the location of each waypoint and the directionality associated with each waypoint respectively. A location constraint may be a threshold distance or a threshold walking ETA between a waypoint and a candidate point. A directionality constraint may be a threshold angular difference between the direction associated with the candidate point and the directionality associated with the waypoint.

After retrieving candidate points for each waypoint plan, the network system uses a route determination engine to determine a route and ETA for each combination of candidate points in each waypoint plan. For example, if the dynamic routing engine retrieved four candidate points for each of the two waypoints in a plan then there would be sixteen candidate point combinations for the route determination engine to evaluate. After receiving route and ETA information for each candidate point combination, the dynamic routing engine performs post-pruning to eliminate routes that have exceptionally long ETAs or result in exceptionally large fares, as determined by the fare estimation engine.

The dynamic routing engine then evaluates each of the remaining routes for each service provider based on a set of selection criteria. The selection criteria may include ETA, fare, distance, fuel usage, or user profile related concerns. In some embodiments, the selection criteria specify that the route with the fastest ETA should be selected. In other embodiments, the selection criteria specify that the route with the lowest fare should be selected and, in yet another embodiment, the selection criteria specify weights for ETA and fares so that a balanced selection can be made by the dynamic routing engine. In some embodiments, the ETA includes walking time between the waypoints associated with the route and the corresponding candidate point for that waypoint.

Once the dynamic routing engine has selected a route for each service provider, the service provider selection engine uses a second set of selection criteria, which may be the same or different from the first, to select one or more service providers from the set of potential service providers. In a non-autonomous embodiment, upon selection of the service providers, the drivers of the selected vehicles are notified that they may accept the service request. The first driver to accept may then be provided with the start, end, waypoint, and route data in order to provide services in accordance with the service request.

In some embodiments, the dynamic routing engine is notified of the service provider that is accommodating the service request. The dynamic routing engine may then periodically monitor the status of the service provider. If the status of the service provider satisfies a set of reevaluation criteria then the dynamic routing engine may repeat the process of selecting candidate points for the remaining waypoints in the service provider's route. Reevaluation criteria may include the service provider being located within a threshold distance of a waypoint or an end point, a deviation of the service provider from its prescribed route, the selection by the driver of an additional service request after completion of the first request, a change in the traffic conditions on or around the route or any other condition of the service provider or driving environment that may warrant a reevaluation of end points.

Additional features of the various embodiments are described further below, and nothing in this summary is intended as limiting in scope, or as indicating that a particular feature is essential or otherwise required.

BRIEF DESCRIPTION OF THE DRAWINGS

FIGS. 3A-3D are process flow diagrams illustrating a method for dynamically determining start and end points for a service provider in a network in accordance with one embodiment.

FIG. 7A illustrates the calculation of the individual haversine distances for each individual service request for a potential active service provider in accordance with one embodiment.

FIGS. 7B-7E illustrate the calculation of haversine distances and a distance ratio for a plan based on a waypoint permutation in accordance with one embodiment.

FIG. 7F illustrates the selection of a waypoint plan using a distance ratio threshold in accordance with one embodiment.

FIG. 10A illustrates a potential service provider's current location and current route in accordance with one embodiment.

DETAILED DESCRIPTION

One use case we explore here for purposes of illustrating various embodiments involves a network system using automobiles. Specifically, drivers and passengers utilizing applications installed on mobile computation devices to communicate with the network system. Passengers use their mobile devices to request service from origin locations to destination locations and the network system notifies drivers that are available to accept the request. A driver then accepts the request using an application on their mobile device and provides the service as requested. Other use cases exist—in general, any application in which vehicles are used to perform services relating to people or objects—and the particular examples that flow throughout this description should be understood to be given for ease of illustration, and not as a limitation of scope.

Considering the example of a network system, typically when a request is made by a service requester (e.g., a passenger) for a service from one location to another, a network system will determine a route from an origin location provided by the service requester (e.g., the current GPS location from the mobile device of the service requester or a geocoded address provided by the service requester through the mobile device application) to a destination location (e.g., an address provided by the service requester) through a particular road topography. Depending on the specific workings of a particular network system, the network system might consider a number of factors in determining the route, including the length of the route, the estimated time a service provider would require to complete the route, the estimated fare that would be incurred for the route, or any other factors. The driver of the vehicle will then typically attempt to pick up the service requester as close as possible to their provided origin location and will follow the determined route to the service requester's destination. The driver then may attempt to drop off the service requester as close to their destination as possible. These driver behaviors may introduce a number of inefficiencies to the network system. For example, the user's provided origin location may be in a popular or heavily trafficked area causing delays in service requester pickup. Alternatively, a provided origin location may be across the street from where the arriving vehicle stopped, such that the service requester may be tempted to illegally or unsafely cross the street to board the vehicle, or the vehicle may have to make a U-turn or other inefficient maneuver to reach a provided origin location.

Figure 1:
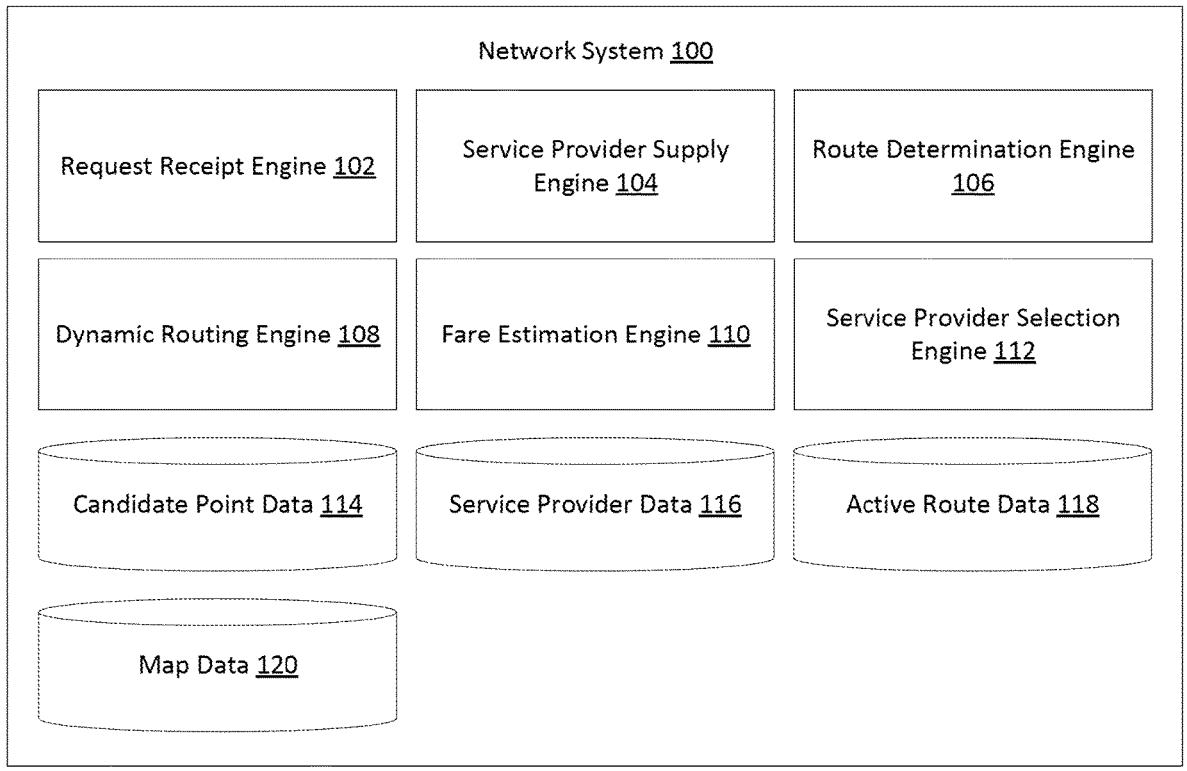
FIG. 1 is a block diagram illustrating computational components of a network system in accordance with one embodiment.

As such, the described embodiments improve efficiency by decreasing wait times, ETAs, and total trip time, and increasing service provider utilization while improving safety for networks, such as passenger transportation networks. FIG. 1 is a block diagram illustrating computational components of a networks system in accordance with one embodiment. A network system 100 utilizing a dynamic routing engine 108 is disclosed that dynamically determines start and end locations and corresponding routes. By specifying start locations in the vicinity of origin and destination locations, improvements may be made in efficiency, as explained, by requesting that the service requester walk to or from a designated start or end location respectively. If a user is unable to walk to the determined start or end location, this may be indicated in a profile for the user, or in a service request, to ensure that all users may be served without inconvenience.

Network system 100 coordinates services for users of the network system 100. For example, the network system 100 may communicate with drivers of automobiles in a geographical area to provide a service for users of the network system from an origin to a destination location. In another embodiment, the network system 100 may be a food delivery system and may communicate with drivers so that they may pick up food from restaurants or other locations and deliver the food to users. The methods for dynamically determining start and end locations in a route for a service provider in a network may be applied to any application of vehicle networks where start and end services are provided.

The network system 100 is in communication with a number of service providers in a network distributed around a geographical area, such that they may complete services in and around the geographic location. For example, in a passenger transportation system, drivers equipped with applications provided for communication with the network system 100 may use their personal vehicles to provide rides to service requesters. Likewise, the network system 100 is also in communication with users of the network system that may request services from the service providers in a network. The network system 100 is also in communication with a number of potential service requesters, each of whom are equipped with a mobile device and an installed application with which to request services from the service providers in the network.

To provide the above-mentioned services, the network system 100 may utilize computation components including a request receipt engine 102, a service provider supply engine 104, a route determination engine 106, a dynamic routing engine 108, a fare estimation engine 110, and a service provider selection engine 112 along with data stores for candidate point data 114, service provider data 116, active route data 118 and map data 120. Depending on the embodiment, the computational components illustrated in FIG. 1 may be implemented on a single computational device or on multiple server systems connected by a network.

Request receipt engine 102 handles incoming service requests from users of the network system 100. A service request contains an origin location and a destination location. The origin and destination locations in a service request can be provided by using an address, a GPS location determined by the mobile device of a user or the name of a point of interest from which a location can be determined. Additionally, the user may specify in a service request whether active service provider (e.g., vehicles currently providing a ride to another user, currently on a delivery route, or currently on any route designated by the network system) may be utilized to accommodate the service request. Depending on the application of the network system a service request may specify additional details for the service. For example, in a passenger transportation application, a service request may specify a type of vehicle for the ride, a number of service requesters to be given a ride, or any other detail relevant to providing a ride to service requesters in a vehicle. In a food delivery application, examples of additional details may include a food order or description, a delivery time, or any other details relevant to the food delivery application.

The request receipt engine 102 parses service requests and extracts data important to the selection of potential service providers, the determination of start and end locations and an associated route for those service providers, and a selection of one or more service providers that may be provided the opportunity to accept the service request (in the case the vehicles are autonomous a single vehicle may be selected that will accommodate the service request). Upon extracting data from the service request, the request receipt engine 102 communicates with the other computational components, which implement methods for dynamically determining start and end locations.

The service provider supply engine 104 monitors the location and status of each service provider in the network system 100. In some embodiments, a driver application installed on devices of service providers periodically reports its GPS location to the network system 100. In these embodiments the service provider supply engine 104 receives the reports from each of the service provider devices and updates service provider data 116 accordingly. Additionally, the service provider supply engine 104 may receive indications that service providers have accepted service requests for which they are eligible. The service provider supply engine 104 may then update active route data 118 to keep track of the status and current route of each service provider. In addition to maintaining the service provider data 116 and active route data 118, the service provider supply engine 104 provides a set of potential service providers based on a service request. This process is explained in greater detail with reference to FIG. 5.

The route determination engine 106 determines routes between two or more locations at the request of other computational components of the network system 100. The route determination engine 106 may utilize map data 120 and route determination algorithms to determine a path between two or more locations on a map. Depending on the embodiment, the route determination engine 106 may utilize traffic data (current or historical) or other data describing the environment that the service providers are operating within. For example, if the network system 100 is operating a VTOL aircraft transportation network, weather conditions may be incorporated into the algorithm used by the route determination engine 106. In some embodiments, the route determination engine 106 determines the route with a minimum duration of a trip that visits each of the two or more locations. In other embodiments, distance, fuel consumption, vehicle occupant safety and other considerations may be used by the route determination engine 106 to determine a route between two or more locations. Those of skill in the art will appreciate that a number of algorithms are capable of determining a route between two points. Map data 120 or any of the data utilized by the route determination engine 106 may be curated and stored by the network system itself. Alternatively the network system 100 may receive data from a third party source for use by the route determination engine 106.

In addition to generally determining a route between two locations, the route determination engine 106 may also be used to determine a walking route and duration from a requested origin to a start location and from a end location to a requested destination.

The dynamic routing engine 108 works in concert with the other computational components of the network system 100 to dynamically determine start and end locations and an associated route for each potential service provider that may be able to accommodate a service request. The dynamic routing engine 108 selects start and end points from candidate point data 114 and calculates routes for each combination of start and end points. This process is completed to determine one or more preferred routes for each potential service provider provided by the service provider supply engine 104 in response to a service request. The computation components of the dynamic routing engine 108 are further described with respect to FIG. 2, and the functions of the dynamic routing engine 108 are further described with respect to FIGS. 3A-3D.

Candidate point data 114 is a set of candidate start and end points that may be selected as part of a route determined by the dynamic routing engine 108. Candidate points may be indicated by GPS coordinates or a geocoded address depending on the embodiment. The candidate point data 114 may be manually curated or automatically generated based on map data 120 and other data by either the network system 100 or a third party. In some embodiments, candidate points may be primarily associated with an intersection of road segments in map data 120. Alternatively, a candidate point may be associated with a corner of an intersection or a particular location on a road segment from map data 120. In some embodiments, candidate points located on the corner of the same intersection may be associated with each other so that all candidate points located proximate to an intersection can be easily retrieved. In some embodiments, historical start and end data along with historical traffic conditions may be used to generate candidate points or eliminate previously generated points that have been deemed dangerous. In another embodiment, road segments in map data 120 may be classified by road type, or they may have metadata indicating whether pick up or drop off activity is legal or safe on the segment. The network system 100 may use this metadata to eliminate candidate points deemed to be in illegal or unsafe start or end locations.

Figure 4A:
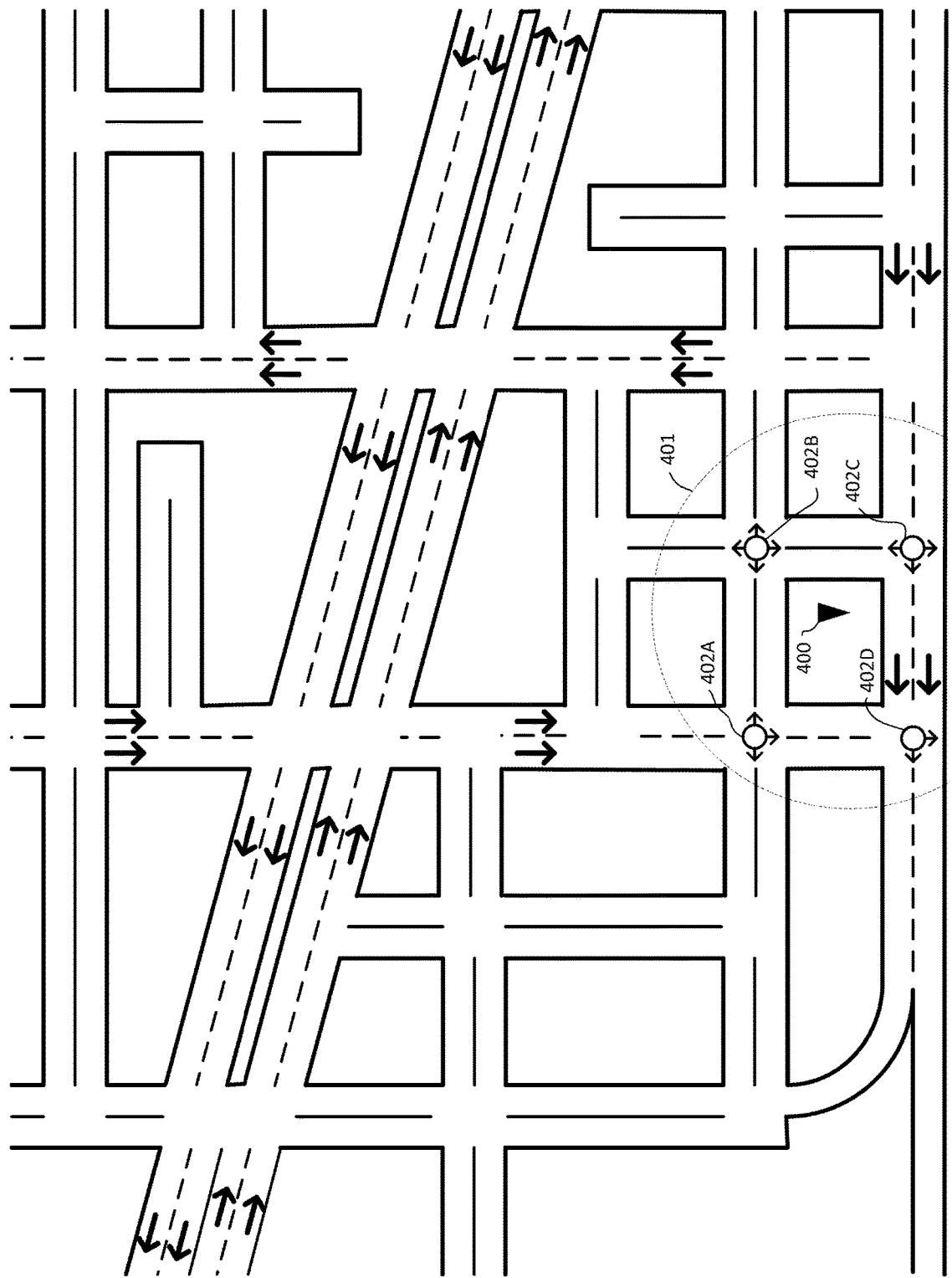
FIG. 4A illustrates an example set of start or end points that are associated with intersections within a distance threshold of a waypoint in accordance with one embodiment.

FIG. 4A illustrates an example set of start or end points that are associated with intersections within a distance threshold of a waypoint in accordance with one embodiment. FIG. 4A illustrates an example road topography for an example network system 100 that coordinates trips of automobiles on a road. Those of skill in the art will appreciate that for network systems that do not involve automobiles the methodology for the curation, generation, and selection of candidate points may be adjusted for the specific transportation application. FIG. 4A illustrates four candidate points 402A-402D within a distance threshold 401 of a requested location 400. Candidate points 402A-402D are each associated with intersections of two or more roads. The directionality of a candidate point 402 is defined by the direction of traffic on the roads of the associated intersection. For example, candidate point 402A is associated with the intersection of a one-way road going south and a two-way road going east and west. Thus, candidate point 402A has a directionality corresponding to those three headings (directly east, directly west, and directly south). In an additional example, candidate point 402D is located at the intersection of two one-way streets; one heading west and the other south. Thus, candidate point 402D has a directionality corresponding to two headings (directly west and directly south). While the roads in this example happen to be heading along cardinal directions, any heading corresponding to the direction of a road at an intersection is possible.

In some embodiments, the directionality of candidate points 402 may be modified based on safety concerns at an associated intersection. For example, a candidate point may be located at an intersection of two two-way streets heading north, south, east, and west. However, the east-west traveling street may have no shoulder for picking up and dropping off service requesters. As such, the candidate point located at the intersection would only have a directionality as determined by the network, of north and south despite being a four-way intersection.

Figure 4B:
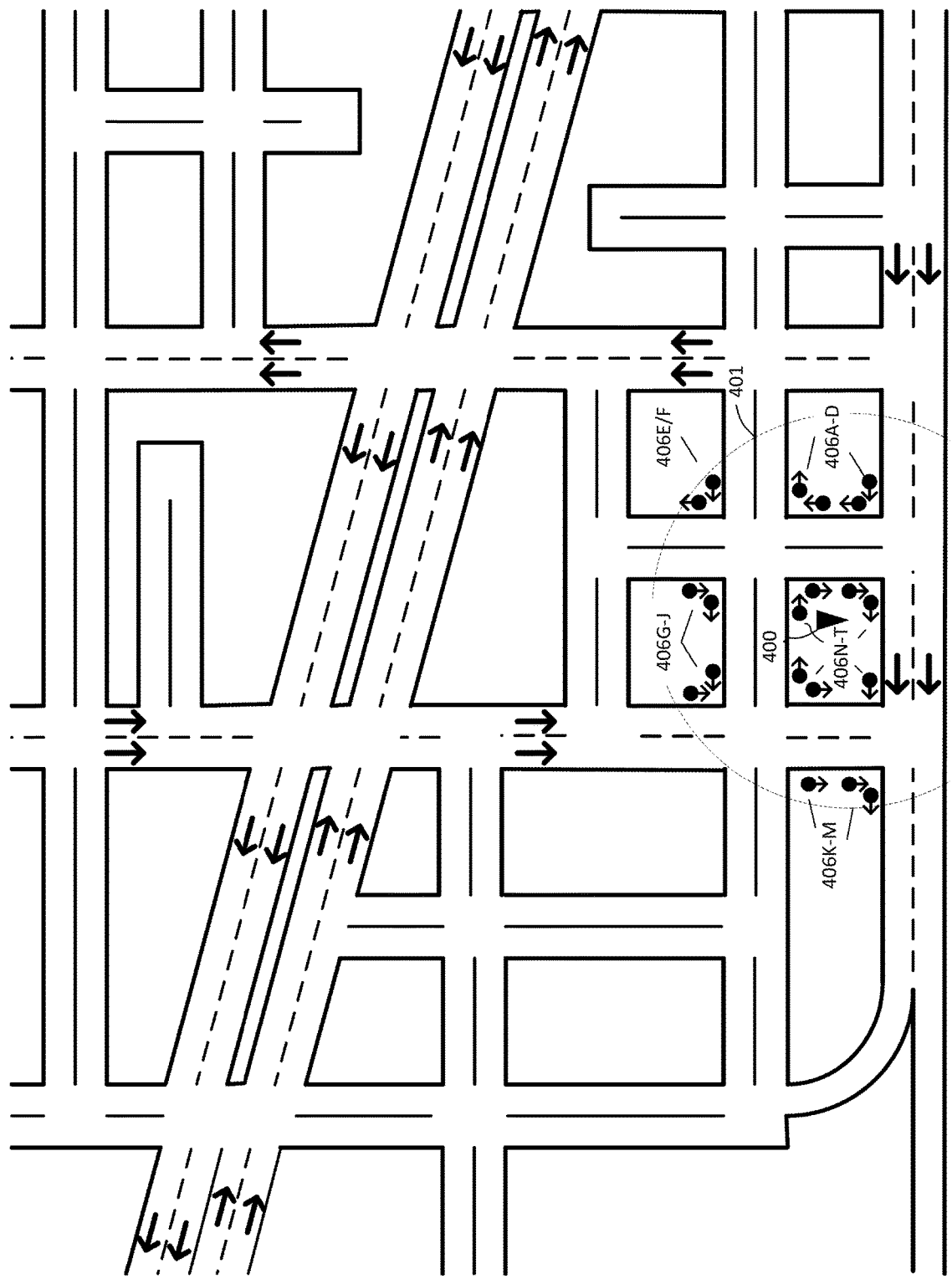
FIG. 4B illustrates an example set of start or end points that are associated with corners within a distance threshold of a waypoint in accordance with one embodiment.

FIG. 4B illustrates an example set of start or end points that are associated with corners within a distance threshold of a waypoint in accordance with one embodiment. FIG. 4B illustrates an example set of candidate points 406A-406T that are associated with corners of intersections as opposed to with the intersections themselves, as illustrated in FIG. 4A. By associating candidate points 406 with a street corner instead of with an intersection, increased precision for the location of start and end points can be achieved at the expense of computational time. The increased computational time involved in the usage of candidate points associated with street corners is the result of the increased density of candidate points in a given area. Methods for achieving greater accuracy while minimizing the impact on computational time are discussed below.

The fare estimation engine 110 determines fares for a given route determined by the route determination engine 106. Depending on the embodiment, the fare estimation engine 110 may determine an estimated fare as a function of various aspects of a route and of the associated service request. Potential factors that may be used include an estimated duration of the route, a distance traveled on the route, an estimated fuel consumption on the route, or any other factor that may be relevant to the pricing of a service. Fares estimated by the fare estimation engine 110 are used by the dynamic routing engine in addition to characteristics of the route itself like ETA (equivalent to an estimated duration of a route) and distance to make selections between potential routes for each service provider. In some embodiments, the fare estimation engine 110 may adjust fare estimates based on the current demand and supply of service providers, reported by the request receipt engine 102 and the service provider supply engine 104 respectively. By including the fare in the selection of a route for a service provider the network system 100 may provide reduced cost services to the user.

The service provider selection engine 112 selects from amongst potential service providers and the associated routes for those service providers that have been selected by the dynamic routing engine 108. The service provider selection engine 112 uses one or more selection criteria to evaluate routes and service provider options. Selection criteria are typically a function relating a particular selection variable to a selection score for a route and service provider combination. For example, the service provider selection engine 112 may use a selection variable of an estimated duration/ETA of the route and score the route proportional to that estimated duration. Alternatively, the service provider selection engine 112 may rank each service provider-route combination according to the estimated duration/ETA and provide a score based on a function of the ranking. In yet other embodiments, a binary score can be applied to selection variables that meet or fail to meet a particular threshold as the selection criteria. Selection variables for the service provider selection engine 112 may include but are not limited to the estimated distance of the route, the estimated time of the route, the estimated fuel consumption of the route, the estimated fare of the route, total walking duration or distance for the user, the estimated safety of the start and end locations (for embodiments where a candidate points include an associated safety score), the waiting time for the user before the service provider can pick up the user, the number of currently active routes for a service provider, or any other characteristics of the route or service provider. Additionally, the selection criteria may change depending on other factors. For example, in poor weather conditions routes with shorter walking distances for the user may be scored higher to reduce the likelihood that the selected route would cause a user to have to walk a long distance in the rain. In another example, if service provider supply is low, service providers with currently active routes may be given a higher score to encourage more efficient utilization of the current supply of service providers.

Figure 2:
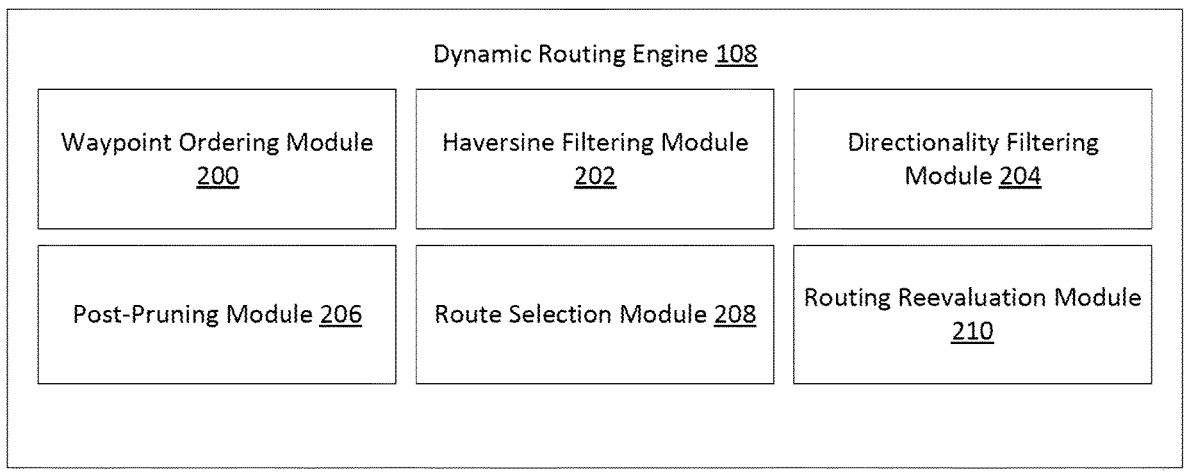
FIG. 2 is a block diagram illustrating computational components of a dynamic routing engine in accordance with one embodiment.
Figure 3D:
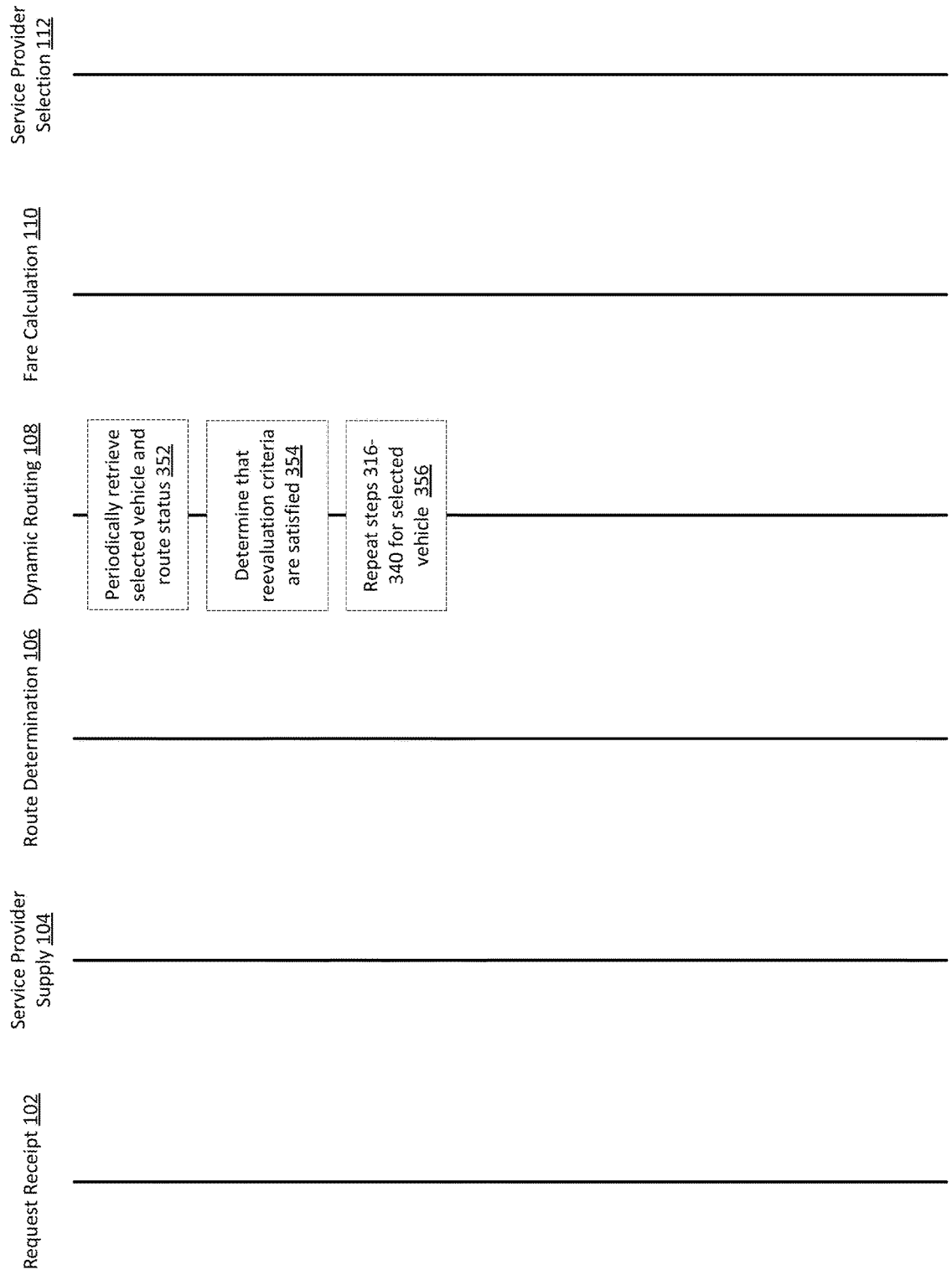

FIG. 2 is a block diagram illustrating computational components of a dynamic routing engine 108 in accordance with one embodiment. The dynamic routing engine 108 may include a number of computational modules so that it is able to perform the functions described previously and with reference to FIG. 3 below. In one embodiment, the dynamic routing engine 108 includes a waypoint ordering module 200, a haversine filtering module 202, a directionality filtering module 204, a post-pruning module 206, a route selection module 208, and a routing reevaluation module 210.

The waypoint ordering module 200 generates acceptable waypoint orders as part of a plan for a potential service provider. Each waypoint in a route plan for a service provider may not be an exact start or end point in the route but is instead a user designated origin or destination location that the service provider must pass in close proximity to. Waypoints, as opposed to exact candidates, are used to determine route plans in order to perform initial filters before investing further computational time to determine the precise start and end locations for a route. A service provider that is accommodating a single service request may only have two waypoints—in this case the waypoint ordering module 200 simply returns the single possible order for the origin and destination waypoint and thereby creates a route plan wherein the service provider performs a pick up proximate to the origin location and proceeds to a drop off proximate to the destination location. However, if a service provider is currently on an active route and is being considered to satisfy an additional service request, an origin and destination waypoint for each active service request will be included in the route plan, except in the cases where the service provider has already performed a pick up at the origin location and only the destination location of that active service remains as an existing waypoint. Thus, odd numbers of waypoints may be considered when service providers are between start and end stages of an active route. The details of waypoint order generation are explained in greater detail with reference to FIG. 3 below.

The haversine filtering module 202 applies a haversine distance filter to the route plans generated by the waypoint ordering module 200. The haversine filter first calculates the haversine distance between the waypoints of the plan in the order designated in the plan. The total haversine distance in moving directly between the waypoints (regardless of road topography) is then compared, using a distance ratio, to the haversine distance of individual single service request plans involving the waypoints. Thus, a distance ratio is calculated that expresses the haversine distance of proceeding through a set of ordered waypoints divided by the haversine distance of moving between each origin and destination waypoint of the plan individually. A distance ratio less than one indicates that a plan involving multiple service requests would cover a shorter haversine distance than multiple plans satisfying the same request. Once a distance ratio has been calculated for each waypoint plan generated by the waypoint ordering module 200, the haversine filtering module 202 applies a threshold distance ratio and eliminates plans that have a distance ratio exceeding that threshold. The haversine filtering module 202 provides a computationally inexpensive way of reducing the number of potential routes for a service provider before exact routes between start and end points are determined. Because the goal of assigning multiple service requests to the same service provider is to increase efficiency by reducing the travel time and distance of service providers in the network, plans with multiple service requests that require traveling a greater haversine distance than if each of those service requests was carried out individually can be thrown out as sub-optimal. The distance ratio threshold may be adjusted according to the priorities of network system 100, however, it is typically less than one.

The directionality filtering module 204 associates a directionality with each waypoint in a waypoint plan. In some embodiments, the directionality associated with a waypoint is equal to the heading, at the waypoint, to the next waypoint in the plan. After determining the directionality component of each waypoint in a plan, the directionality filtering module 204 may remove, from a set of candidate points for a waypoint, any candidate points that are not within a threshold heading angle from the directionality component of the waypoint. This reduces the number of routes that must be determined between candidate points by removing candidate points that would result in the vehicle facing away from the next destination. Except in unusual road topographies, this usually results in the evaluation of candidate points that are likely to result in more efficient routes. In some embodiments, the surrounding road topology is considered before eliminating candidate points. For example, if a road is known to curve toward the directionality of the waypoint, candidate points on the road that may not be aligned with waypoint directionality may not be eliminated since the eventual direction of the road is within the acceptable heading angles determined by the directionality filtering module 204. Because candidate points are first filtered by their distance to a waypoint, it is possible that no available candidate points satisfy the directionality filter. In this case, candidate points that would otherwise be removed may be evaluated as part of a route for a potential service provider.

The post-pruning module 206 reduces the number of routes that must be analyzed in order for the dynamic routing engine 108 to select acceptable routes for each potential service provider. Upon receiving route and ETA information from the route determination engine 106, the post-pruning module 206 may eliminate inefficient options. For example, the post-pruning module 206 may remove routes that have a statistically high distance or ETA associated with them when compared to other options. One of skill in the art will appreciate that many statistical techniques may be used to set elimination thresholds for the distance or ETA of a set of route options.

The route selection module 208 performs a similar function to the service provider selection engine 112 and selects a route for each potential service provider that may be selected to accommodate a service request from a user. The route selection module 208 evaluates a set of selection criteria, which may be the same or different than the selection criteria used by the service provider selection engine 112, to determine a route with the highest score for each potential service provider for a service request. This list of possible selection variables is similar to the selection variables that may be utilized by the service provider selection engine 112. Depending on the embodiment, the route selection function used by the route selection module 208 in evaluating the route selection criteria may differ from the service provider selection function used by the service provider selection engine 112 even if both functions include the same selection variables. For example, the route selection function may weigh distance and ETA as a larger component of the overall score while the service provider selection function may weigh the waiting time for the user as a top priority. Those of skill in the art will appreciate that any linear or non-linear function may be used to calculate a score for a service provider associated with a route.

The route reevaluation module 210 determines whether a route currently being executed by a service provider should be dynamically reevaluated by the dynamic routing engine 108. It may be the case that while a service provider is executing a route, for example, providing a ride for a user from an origin to a destination, traffic conditions or other factors that could affect the previously determined end location may change. Therefore, the dynamic routing engine 108 may need to recalculate a end location under certain conditions. The route reevaluation module 210 monitors service provider data 116, active route data 118, map data 120, and any live traffic, weather data, or other environmental factors to determine if a set of reevaluation criteria have been met. If the route reevaluation module 210 determines that a route should be reevaluated, the dynamic routing engine 108 recalculates possible routes with the service provider as the only potential service provider. In some embodiments, the reevaluation criteria may include a threshold haversine or routed distance of the service provider from a start or end location on the route. For example, the dynamic routing engine 108 may reevaluate a start or end point on a route when active route data 118 indicates that the service provider is within 1 mile of the end point. Alternatively, the reevaluation criteria may include a time threshold. For example, the dynamic routing engine 108 may reevaluate a start or end point when service provider data 116 or active route data 118 indicates that the service provider is an estimated three minutes away from a start or end point. In addition to triggering a reevaluation based on a particular state of conditions (e.g., a threshold amount of traffic) the route reevaluation module 210 may cause the dynamic routing engine 108 to reevaluate a service provider route based on a change to conditions (e.g. a change in traffic conditions on the route).

FIGS. 3A-3D are process flow diagrams illustrating a method for dynamically determining start and end points for a service provider in a network in accordance with one embodiment. FIGS. 3A-3D are progressive illustrations of one process. Therefore, the last step in FIG. 3A leads into the first step in FIG. 3B, and so on. A smaller or larger number of steps may be included in the method illustrated by FIGS. 3A-3D. Furthermore, steps described herein but not represented in FIGS. 3A-3D are not included for ease of illustration. Additionally, depending on the implementation of the network system 100, additional steps known in the art may be used to perform the functions described herein.

A method for dynamically determining start and end points for a service provider in a network begins when network system 100 receives a service request 300 using request receipt engine 102. As previously described, the service request may include an origin location and a destination location in addition to other details that may be useful for accommodating the service. The request receipt engine 102 parses the received request and may perform any functions for converting provided addresses to a GPS location so additional steps can be completed.

The request receipt engine 102 then transfers the received origin location 302 of the service request to the service provider supply engine 104. The service provider supply engine 104 may then select a set of potential service providers 304 that may be able to accommodate the service request. Depending on the details of the received service request, the service provider supply engine 104 may select active service providers that are already accommodating a service request, inactive service providers that are available and not currently accommodating a service request, or both types of service providers. Step 304 is further described with respect to FIG. 5.

Figure 5:
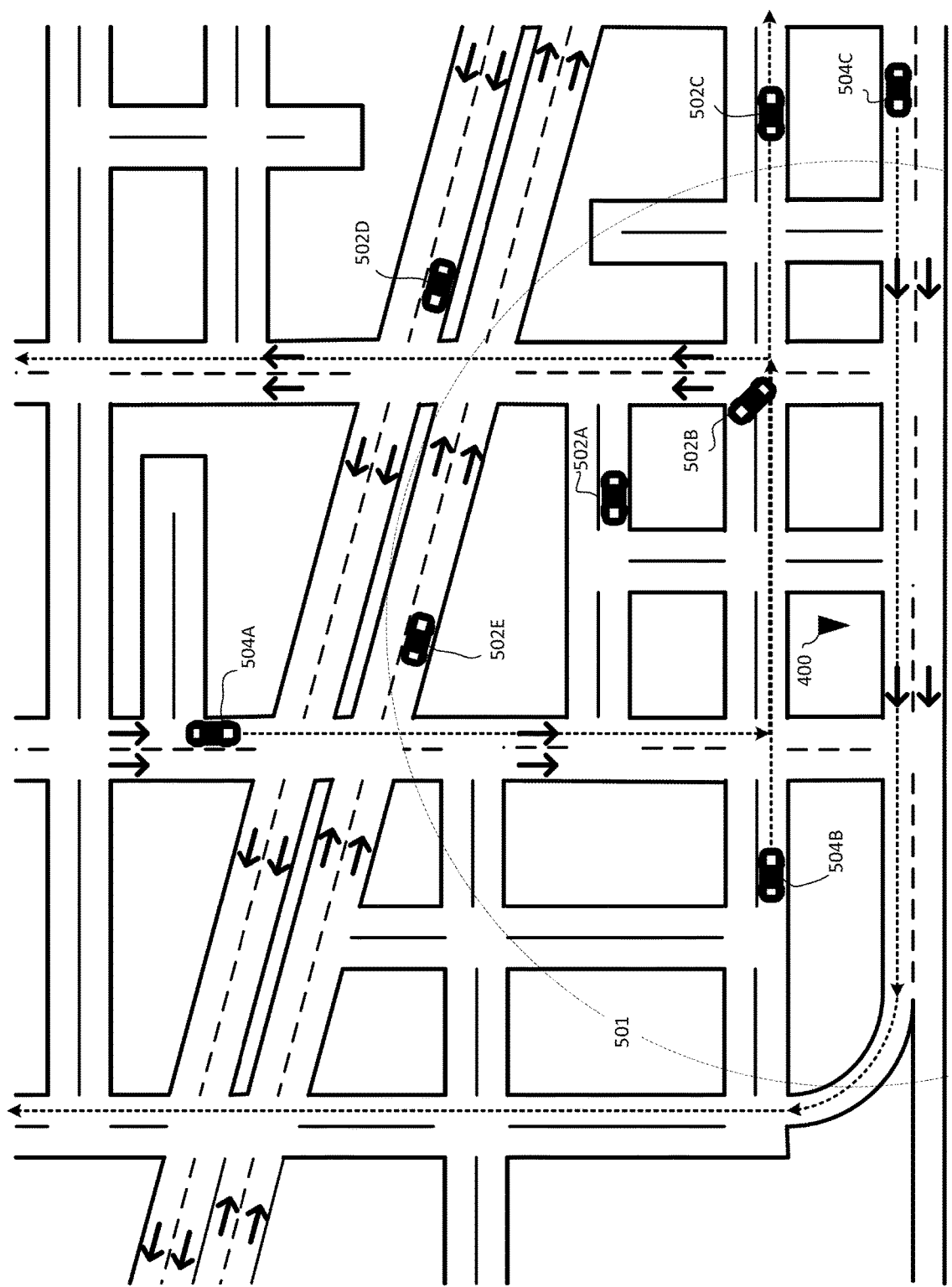
FIG. 5 illustrates an example road topology and an example set of service provider locations and routes in addition to a distance threshold for selecting potential service providers in accordance with one embodiment.

FIG. 5 illustrates an example road topology and an example set of service provider locations and routes in addition to a distance threshold for selecting potential service providers in accordance with one embodiment. In order to select a set of potential service providers 304, service provider supply engine 104 references service provider data 116, and active route data 118 to identify inactive service providers within a threshold distance of the requested origin location 400 for a service. The service provider supply engine 104 may then use haversine distance threshold 501 (indicated by a dotted line circle in FIG. 5) to determine inactive service providers 502 that are located within the threshold distance. In some embodiments, the service provider supply engine 104 may utilize the route determination engine 106 to determine the ETA of inactive service providers, at the origin location 400, in an expanding search radius from an origin location 400. The service provider supply engine 104 may then select inactive service providers with less than a threshold ETA to the origin location 400.

Additionally, the service provider supply engine 104 may select active service providers 504 by determining which routes pass within the radius of the distance threshold 501 and selecting the active service providers 504 that are executing those routes. The service provider supply engine 104 may reference service provider data 116 to determine which active service providers 504 are at capacity or are not accepting additional service requests.

In the example of FIG. 5, inactive service providers 502A, 502B, 502C, 502D, and 502E are shown on the map in addition to active service providers 504A, 504B, 504C, and 504D as well as their associated routes, which are indicated by dotted arrows extending from each service provider. In this example, the service provider supply engine 104 may use distance threshold 401 to select inactive service providers 502A, 502B, and 502E and active service providers 504A-504D as potential service providers.

After the service provider supply engine 104 selects a set of potential service providers 304, the service provider supply engine 104 provides the potential service provider set 306 to the dynamic routing engine 108 for further evaluation. The dynamic routing engine 108 uses waypoint ordering module 200 to generate 308 a waypoint plan for each inactive potential service provider and generates a set of possible waypoint plans for each active potential service provider 316. A waypoint plan is an ordered list of destinations for the potential service provider to visit on a route satisfying a received service request as previously described with respect to FIG. 2.

Figure 6A:
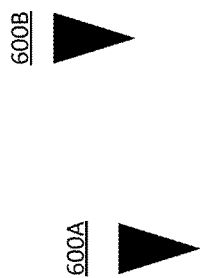
FIG. 6A illustrates an example set of waypoints of an active service provider including a requested origin and destination and a list of corresponding waypoint permutations in accordance with one embodiment.
Figure 6A:
Figure 6A:

FIG. 6A illustrates an example set of waypoints of an active service provider including a requested origin and destination location and a list of corresponding waypoint permutations in accordance with one embodiment. FIG. 6A illustrates a set of four waypoints for an active potential service provider. Roads and other topography are not shown for ease of illustration but the illustrated waypoints may be assumed to be distributed across a navigable landscape of some kind. 600A and 600B are origin waypoints and represent requested origin locations while 602A and 602B are destination waypoints. Waypoints 600A and 602A are the origin and destination for a first service request while 600B and 602B are the origin and destination for a second service request. In the illustrated example, the potential service provider accommodating the first service request is being considered to accommodate the second service request, as a member of a set of potential service providers for the second service request. The "Waypoint Permutations" table is a visual aid indicating the total number of permutations of the four waypoints so that the list can be compared to the final set of generated waypoint plans. However, many of the waypoint permutations are illogical; i.e. the destination waypoint is placed before the origin waypoint. Other permutations, such as "600A, 602A, 600B, 602B" represent a waypoint plan where the service provider completes each service request sequentially, in effect defeating the purpose of utilizing an active service provider to complete a service request. These waypoint plans may also be eliminated from a generated set of waypoint plans because it is rarely efficient when compared to waypoint plans for inactive potential service providers. However, in some embodiments, these orders may be allowable in cases where no inactive potential service providers can be found by the service provider supply engine 104. The waypoint ordering module 200 need not generate all possible permutations shown in FIG. 6A and eliminate them in the progression illustrated by FIGS. 6B-6C. Waypoint ordering module 200 may have a pre-calculated set of waypoint orders for each possible number of waypoints for an active service provider.

Figure 6B:
FIG. 6B illustrates illogical waypoint permutations in accordance with one embodiment.
Figure 6B:
Figure 6B:
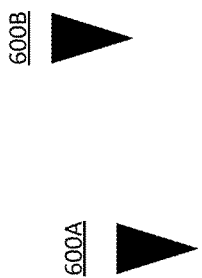

FIG. 6B illustrates illogical waypoint permutations in accordance with one embodiment. In FIG. 6B all permutations of the illustrated waypoints 600A, 600B, 602A, and 602B that include an origin waypoint (either 600A or 600B) before the corresponding destination waypoint (either 602A or 602B), are shown as crossed out from the "Waypoint Permutations" table.

Figure 6C:
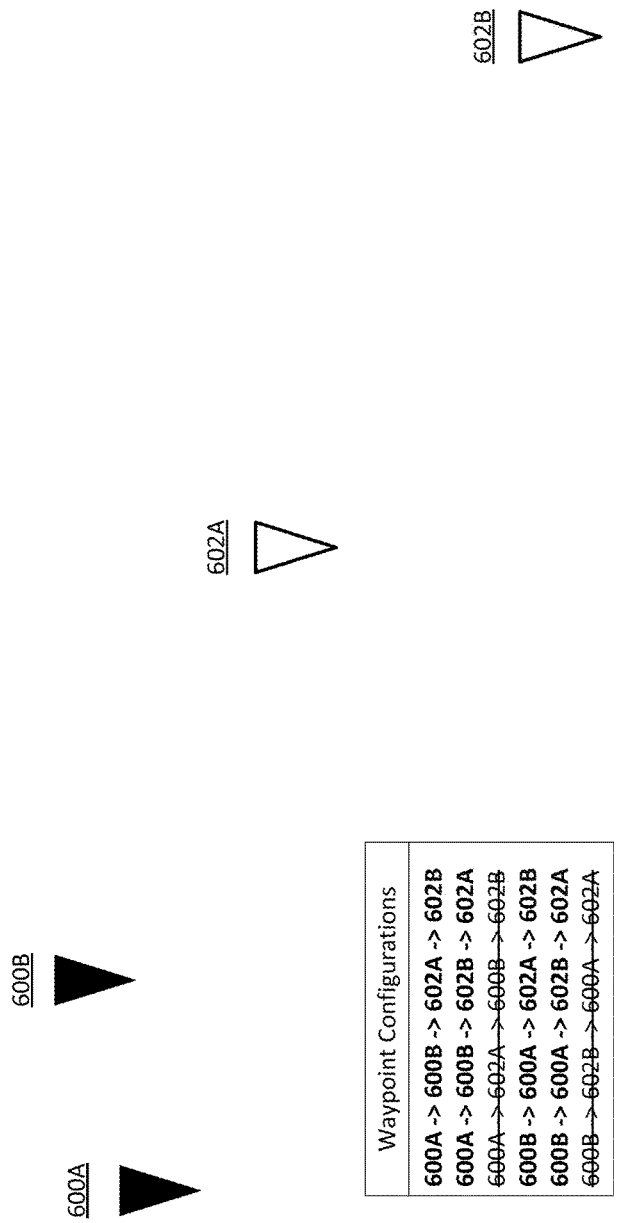
FIG. 6C illustrates inefficient waypoint permutations in accordance with one embodiment.

FIG. 6C illustrates inefficient waypoint permutations in accordance with one embodiment. FIG. 6C shows waypoint plans for an active service provider that are eliminated (shown as lined-through) by the waypoint ordering module 200 because they have been deemed likely to be inefficient compared to two or more routes taken by inactive service providers. Typically, plans eliminated by the waypoint ordering module 200, are plans that include an origin destination pair of waypoints (in this example 600A and 602A or 600B and 602B) ordered consecutively at either the beginning or the end of a waypoint plan. Typically when a plan has such an order the plan would be better served by simply using an inactive service provider to provide a service for the origin and destination pair located at the beginning or end of the waypoint order, as opposed to delaying the active route of the active service provider.

Once the waypoint ordering module 200 generates a set of waypoint plans for a potential service provider to accommodate a service request, the dynamic routing engine 108 applies a haversine filter to the set of waypoint plans 318 using the haversine filtering module 202.

FIG. 7A illustrates the calculation of the individual haversine distances for each individual service request for a potential active service provider in accordance with one embodiment. The haversine filtering module 202 first calculates the individual haversine distances for each service request in a waypoint plan (in the illustrated example 600A and 602A, and 600B and 602B represent the origin and destination waypoints respectively for two service requests). FIG. 7A illustrates the calculation of two haversine distances 700A and 700B. The "Individual Distance Sum" table indicates the sum of 700A and 700B is equal to 10.5 arbitrary distance units. In some embodiments, when one or more of the service requests being accommodated by the potential service provider is already in progress, the haversine filtering module 202 may include the haversine distance of the service provider to the next planned end location in the individual distance sum instead of the original haversine distance associated with the corresponding service request. In another embodiment, the haversine filtering module 202 may calculate the sum of the haversine distance of the current waypoint plan being executed by the potential service provider and the haversine distance of the newly received service request waypoints.

Figure 7C:
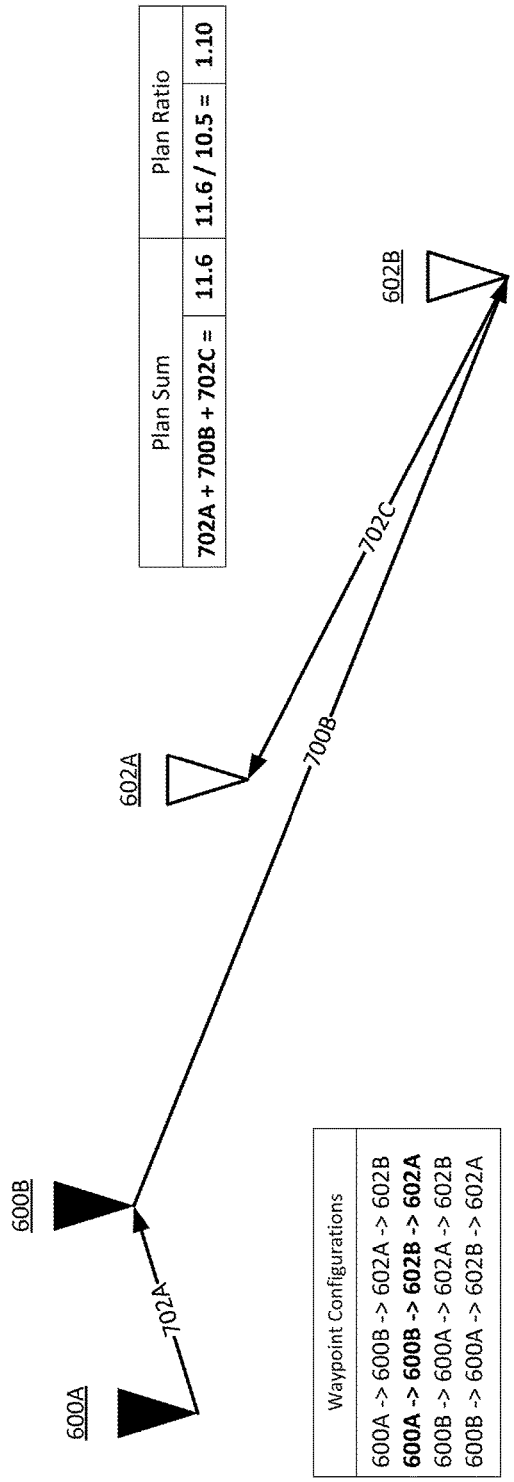

FIGS. 7B-7E illustrate the calculation of haversine distances and a distance ratio for a plan based on a waypoint permutation in accordance with one embodiment. The haversine filtering module 202 then calculates the haversine distance of moving directly between waypoints for each generated waypoint permutation. In this particular example, FIG. 7B illustrates the calculation of the haversine distance for the waypoint plan "600A, 600B, 602A, 602B." The haversine distance sum for the plan is the sum of the haversine distances 702A, 702B, and 702C. In this example, the haversine sum for this plan is equal to 7.5 units, which corresponds to a plan ratio equal to 0.75.

FIG. 7C illustrates the calculation of the haversine distance for the waypoint plan "600A, 600B, 602B, 602A," which is equal to the sum of the previously calculated haversine distances 702A, 700B, and 702C. The plan sum is equal to 11.6 units resulting in a plan ratio equal to 1.10.

Figure 7D:
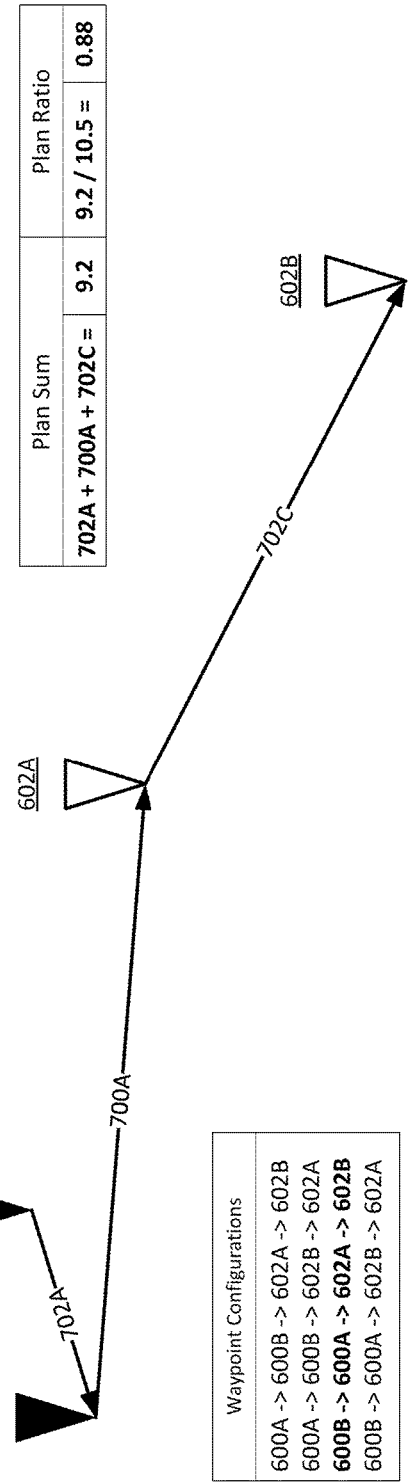

FIG. 7D illustrates the calculation of the haversine distance for the waypoint plan "600B, 600A, 602A, 602B," which is equal to the sum of the previously calculated haversine distances 702A, 700A, and 702C. The plan sum is equal to 9.2 units and the plan ratio is equal to 0.88.

FIG. 7E illustrates the calculation of the haversine distance for the waypoint plan "600B, 600A, 602B, 602A," which is equal to the sum of the previously calculated haversine distances 702A and 702C and the haversine distance 702D. The plan sum is equal to 12.7 units and the plan ratio is equal to 1.21.

FIG. 7F illustrates the selection of a waypoint plan using a distance ratio threshold in accordance with one embodiment. The example illustrated in FIG. 7F provides an example ratio threshold of 0.85 indicating that haversine filtering module 202 will remove from consideration any plans having a distance ratio greater than 0.85. In this example, the only waypoint plan that is not removed from consideration is "600A, 600B, 602A, 602B." Although this example uses an example distance ratio threshold of 0.85, other thresholds may be utilized by the haversine filtering module 202.

After the haversine filtering module 202 applies a haversine filter on the generated waypoint plans for a potential service provider, the dynamic routing engine 108 determines the directionality of each component of the remaining waypoint plans 320 for the potential service provider.

Figure 8:
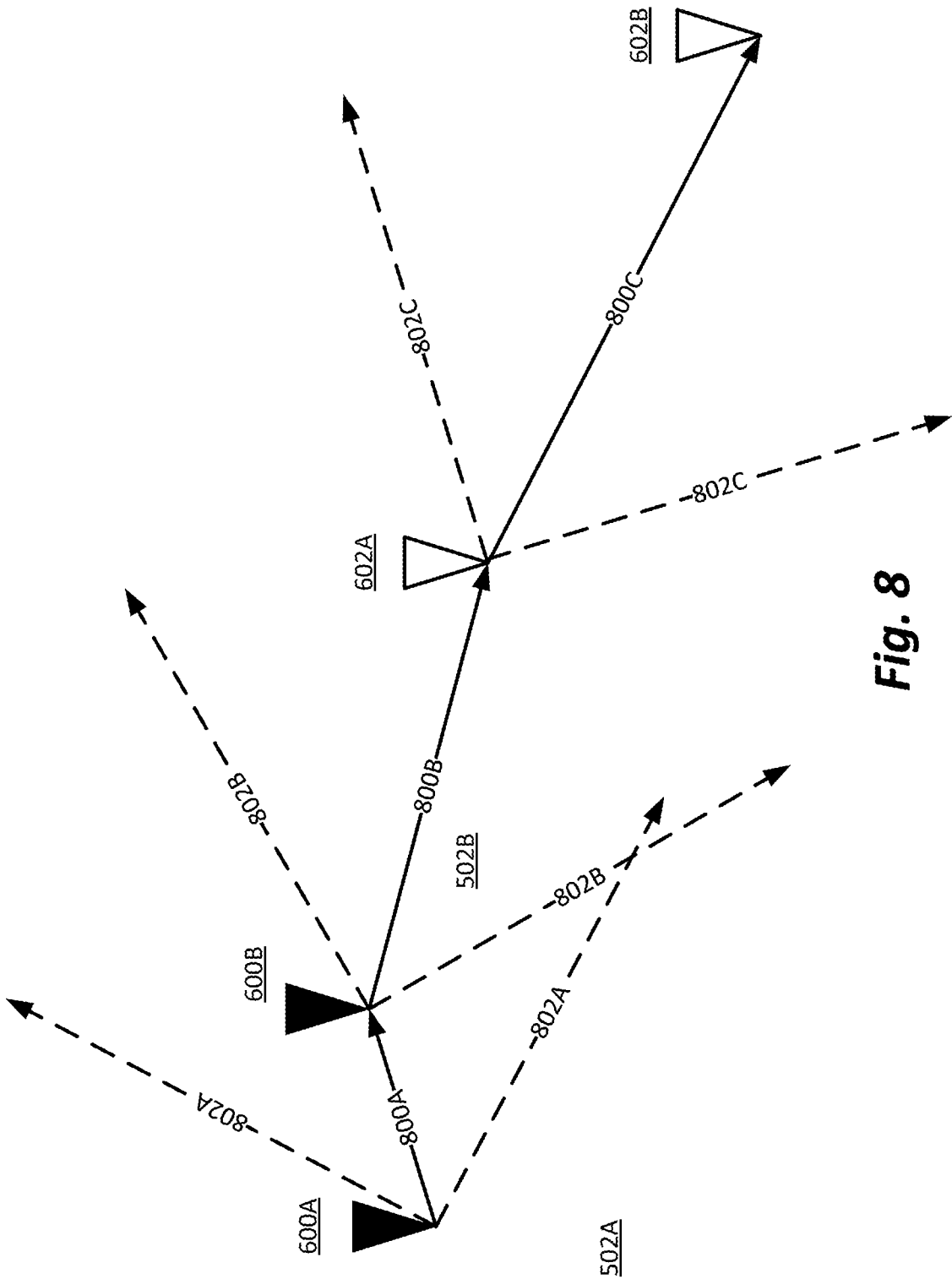
FIG. 8 illustrates the determination of directionality components for each waypoint in a selected plan and the associated threshold headings in accordance with one embodiment.

FIG. 8 illustrates the determination of directionality components for each waypoint in a selected plan and the associated threshold headings in accordance with one embodiment. FIG. 8 illustrates the same example waypoints 600A, 600B, 602A, and 602B. To determine the directionality associated with a waypoint in a waypoint plan 320, the dynamic routing engine 108 determines the heading angle from one waypoint to the next in the waypoint plan. As shown in FIG. 8, the directionality of waypoint 600A is the direction 800A, which is the heading of 600B while located at 600A. Likewise, the directionality of waypoint 600B is equal to the direction 800B, and the directionality of waypoint 602A is equal to the direction 800C. The heading is determined relative to the next waypoint in the plan until determining the directionality for the last waypoint in the plan. In some embodiments, there is no directionality associated with the last waypoint in the plan. In other embodiments, the last waypoint may be given a directionality equal to the heading of a predicted service provider heading after reaching the waypoint.

Because it is unlikely that any candidate start or end points will have an associated directionality exactly equal to the directionality of a waypoint, the dynamic routing engine 108 uses a range of heading angles to select candidate points with a matching directionality. These heading angle ranges are defined by threshold heading angles 802 centered on the directionality of a waypoint. The example illustrated in FIG. 8 indicates threshold heading angles as 802A, 802B, and 802C, for waypoints 600A, 600B, and 602A respectively.

After determining the directionality associated with each waypoint in each plan 320 for a potential service provider, the dynamic routing engine 108 retrieves candidate points that satisfy location and directionality constraints for each waypoint plan for the potential service provider. The candidate points are retrieved from candidate point data 114.

Figure 9A:
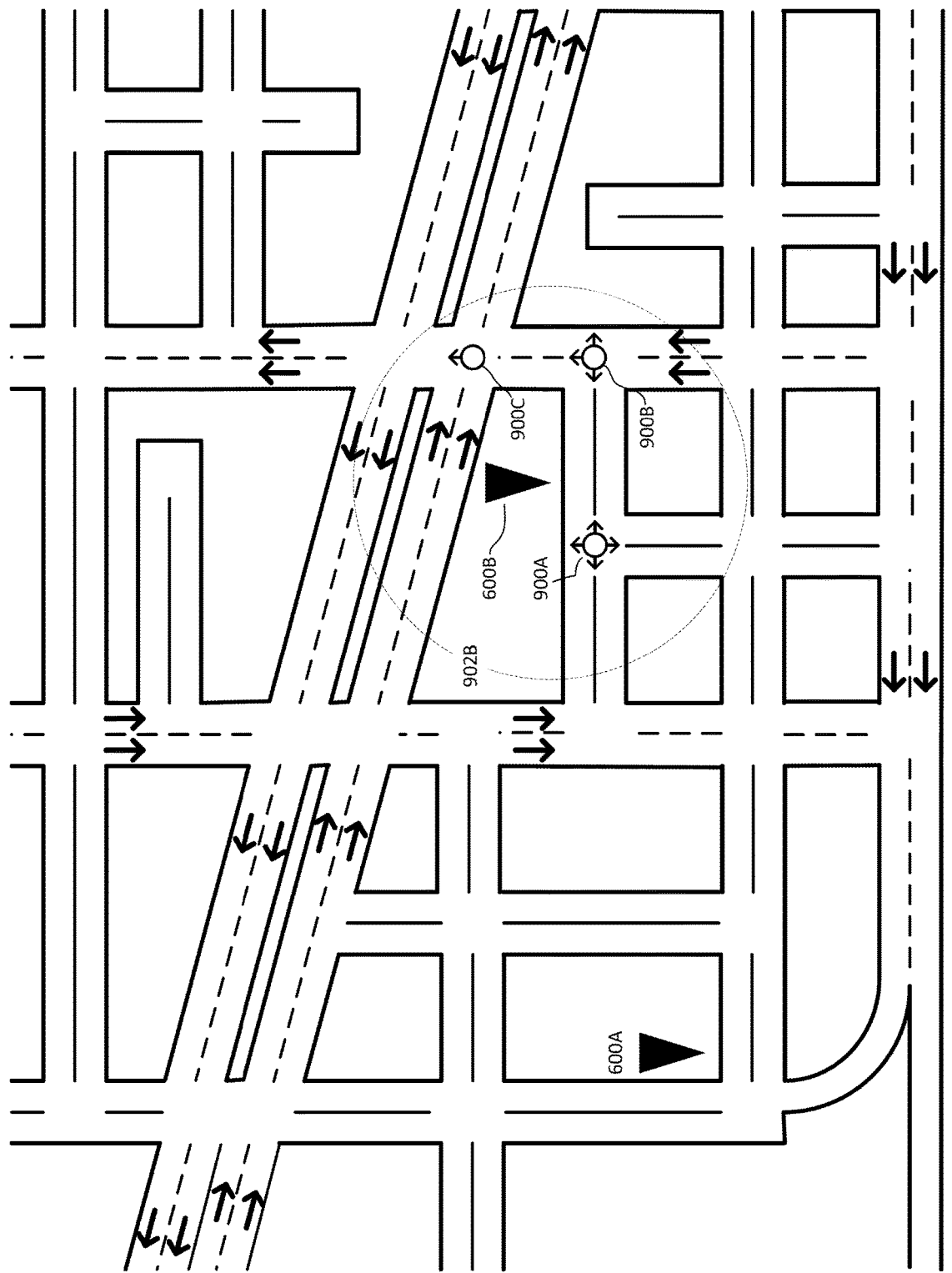
FIG. 9A illustrates an example set of candidate points that satisfy location constraints for a waypoint in accordance with one embodiment.

FIG. 9A illustrates an example set of candidate points that satisfy location constraints for a waypoint in accordance with one embodiment. In some embodiments, the location constraint is a haversine distance threshold, where candidate points within the threshold haversine distance satisfy the constraint and are retrieved from candidate point data 114. In other embodiments, the location constraint is instead a threshold walking ETA for a user walking between the waypoint for which the candidate points are being retrieved and each of the candidate points. Additionally, the dynamic routing engine may first retrieve a set of candidate points based on a threshold haversine distance from a waypoint and then narrow the retrieved set by calculating the ETA for a user walking to each location using the route determination engine 106 and then removing candidate points above an ETA threshold. Any of the embodiments may be used depending on the computational time and efficiency goals for the network system 100.

FIG. 9A shows waypoint 600B, from the waypoint plan example illustrated in FIGS. 6A-6C, 7A-7F, and 8, with a surrounding example road topography. In the example illustrated in FIG. 9A, candidate points are associated with road intersections and have associated directionalities in the directions of the arrows in the illustration. In this example, a haversine distance constraint 902B is shown around waypoint 600B. Three intersections are located within the radius created by the haversine distance constraint corresponding to candidate points 900A, 900B, and 900C. As indicated by the arrows in the illustration, candidate point 900A is associated with each of the four cardinal directions, candidate point 900B is located at an intersection of a one-way road and a two-way road resulting in directionalities in the north, east and west directions. In some embodiments, directionalities of candidate points may be limited based on safety or legal concerns. For example, 900C is located at the intersection of a divided highway and a one lane road, and, as such has only a single directionality heading north. This may be because a start location has been deemed unsafe on divided highways or intersections of this type.

Figure 9B:
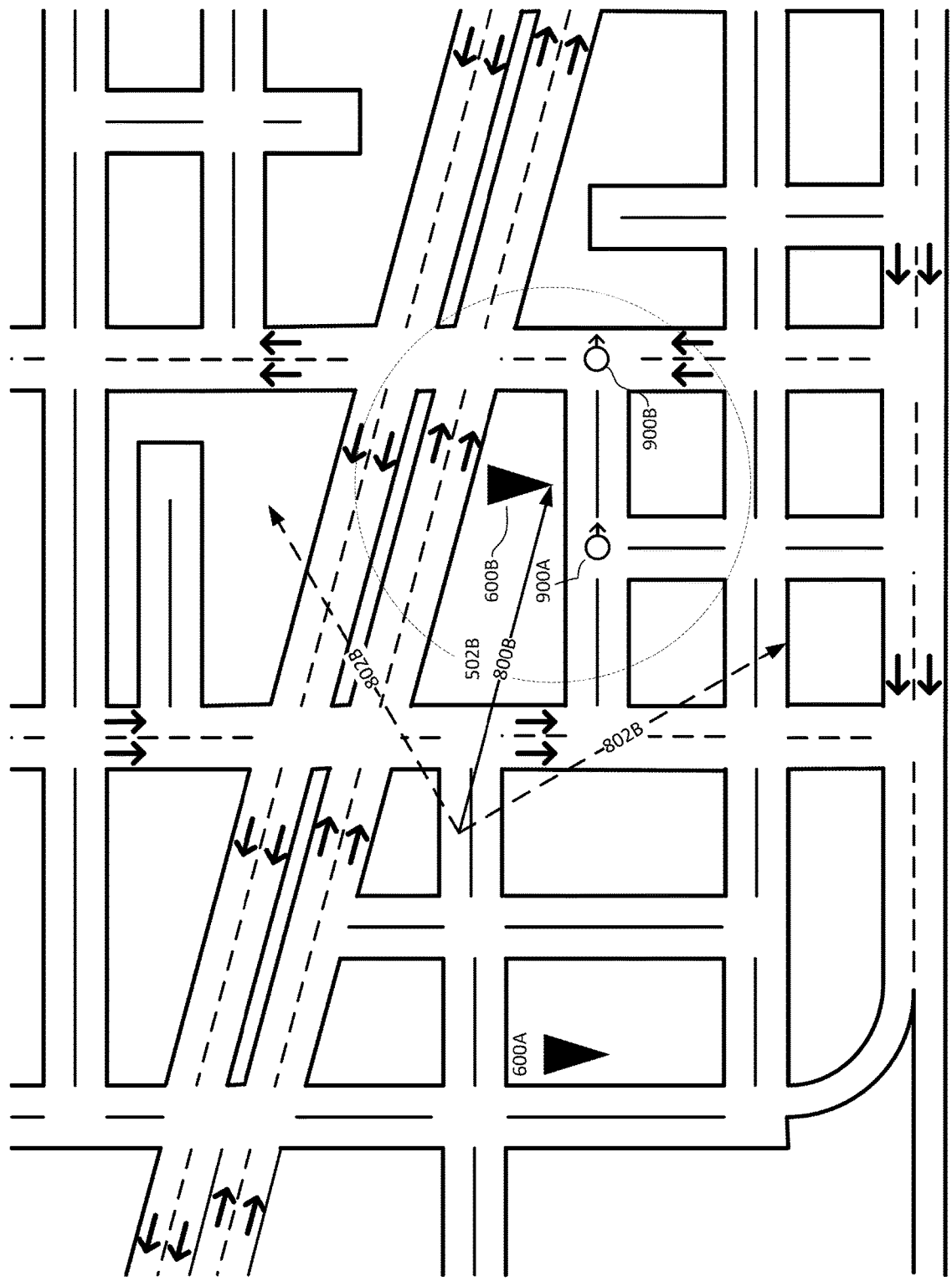
FIG. 9B illustrates an example set of candidate points that satisfy location and directionality constraints for a waypoint in accordance with one embodiment.

FIG. 9B illustrates an example set of candidate points that satisfy location and directionality constraints for a waypoint in accordance with one embodiment. After the dynamic routing engine 108 retrieves candidate points satisfying a location constraint, the directionality filtering module 204 removes candidate points that do not have at least one associated directionality between the threshold heading angles 802 associated with the waypoint. In the example of FIG. 9B, directionality 800B and threshold heading angles 802B are overlaid to illustrate the directionality constraint applied by the directionality filtering module 204. The illustrated directionality 800B and threshold heading angles 802B are offset from 600B for ease of illustration. Because candidate points 900A and 900B are associated with an eastward directionality they have a directionality within the threshold heading angles 802B and so are not removed from the retrieved set of candidate points. However, candidate point 900C had only a northward directionality and so it has been eliminated from the retrieved set of candidate points because the range between the threshold heading angles does not include a northward heading.

Figure 9C:
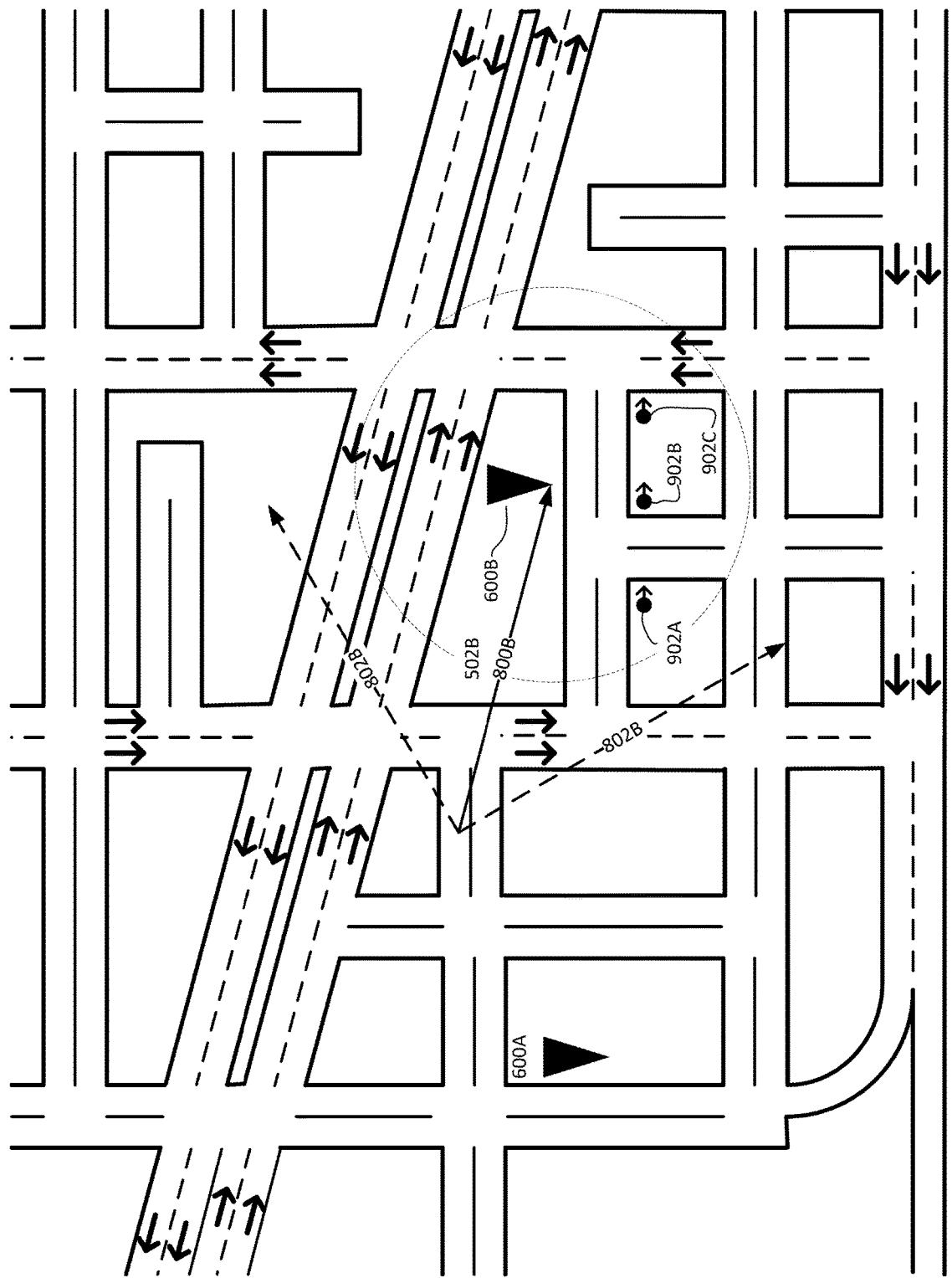
FIG. 9C illustrates an example set of candidate points that satisfy location and directionality constraints for embodiments where candidate points are associated with corners instead of intersections in accordance with one embodiment.

FIG. 9C illustrates an example set of candidate points that satisfy location and directionality constraints for embodiments where candidate points are associated with corners instead of intersections in accordance with one embodiment. The candidate points displaced in FIG. 9C show an alternate embodiment where candidate points are associated with intersection corners instead of intersections themselves. In the illustrated example, candidate points 902A, 902B, and 902C satisfy the same location and directionality constraints used in the FIG. 9B example. As illustrated by FIGS. 9B and 9C, the number of candidate points retrieved by the dynamic routing engine 108 when candidate points are associated with intersection corners may increase when compared to candidate points associated with whole intersections—even while using the same location and directionality constraints. In some embodiments, the candidate point data 114 may include corner candidate points and intersection candidate points and only retrieve corner candidate points after post-pruning has been completed using the intersection candidate points. This may increase the precision of end point determination while minimizing processing time.

Figure 9D:
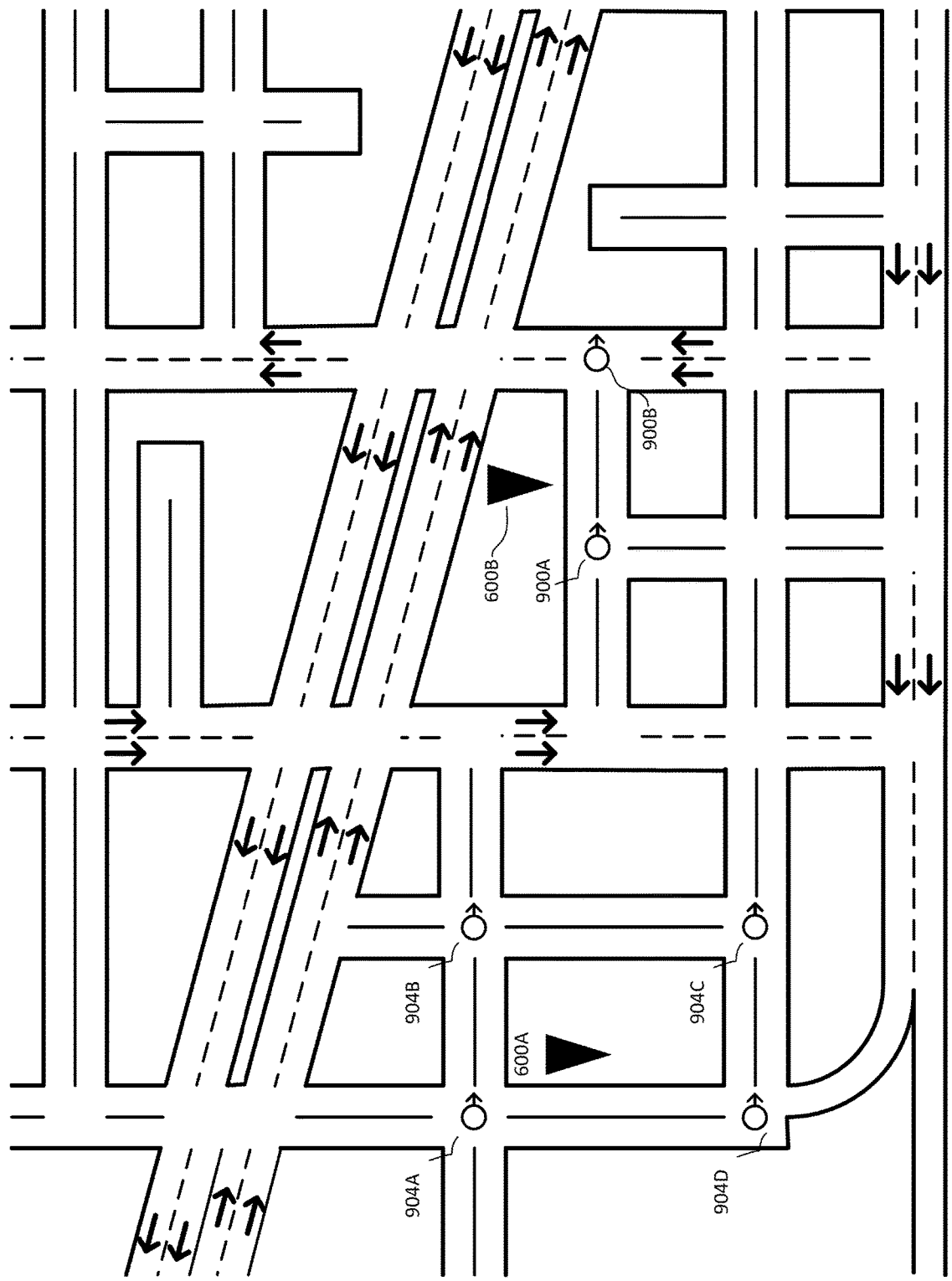
FIG. 9D illustrates an example set of candidate points that satisfy location and directionality constraints for two waypoints in accordance with one embodiment.

FIG. 9D illustrates an example set of candidate points that satisfy location and directionality constraints for two waypoints in accordance with one embodiment. In the illustrated example of FIG. 9D, the same retrieval process described with reference to FIGS. 9A-9C has been used to determine candidate points for waypoint 600A, including candidate points 904A, 904B, 904C, and 904D. The dynamic routing engine 108 also retrieves candidate points that satisfy the corresponding location and directionality constraints for waypoints 602A and 602B, however, these candidate points are not shown for ease of illustration.

After retrieving candidate points 322 for each waypoint in waypoint plans for a potential service provider, the dynamic routing engine 108 requests routes and corresponding ETAs for candidate point combinations 324 in the order specified by each waypoint plan for a potential service provider. The route determination engine 106 then determines a route for each candidate point combination 326 and transfers the estimated ETA and other route information 328 to the dynamic routing engine 108.

FIG. 10A illustrates a potential service provider's current location and current route in accordance with one embodiment. FIG. 10A illustrates a service provider 1000 accommodating the first service request with waypoints 600A and 602A before an additional service request is received by the network system 100. To accommodate the first service request, service provider 1000 has been assigned a route 1002A, which includes start point 904B. The requesting user for the first service request follows walking route 1004A to the determined start point. It may be assumed that this route 1004A and start point 904B has been previously determined by the dynamic routing engine 108 and the service provider 1000 was selected from amongst a number of potential service providers to carry out the route 1004A by the service provider selection engine 112.

Figure 10B:
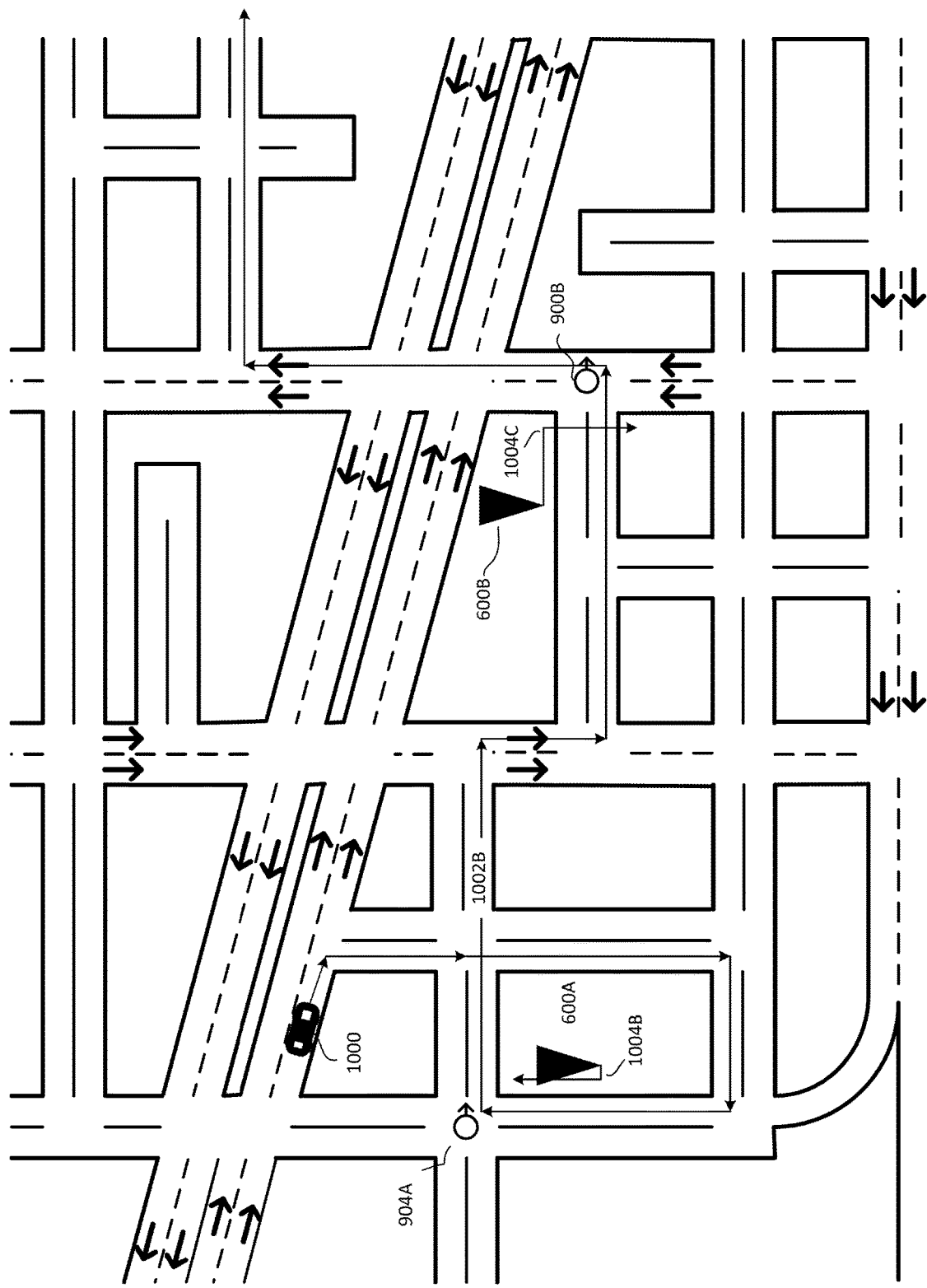
FIG. 10B illustrates an inefficient route for a candidate point combination in accordance with one embodiment.

FIG. 10B illustrates an inefficient route for a candidate point combination in accordance with one embodiment. Continuing the discussion of the example of FIG. 10A, the network system 100 receives a second request and selects service provider 1000 as an active potential service provider for the new request. Candidate points 904A, 904B, 904C, and 904D, and 900A and 900B, are retrieved for waypoints 600A and 600B respectively using the process described above. Route determination engine 106 then determines ETA and route information for each combination of candidate points 326. FIG. 10B illustrates one such route for the combination of candidate points including 904A and 900B. Additional candidate points associated with the other two waypoints in this example, 602A and 602B, would be included in the combination of candidate points, however, for ease of illustration those particular candidate points or waypoints are not shown. The route 1002B and an associated ETA is determined by the route determination engine 106 along with walking routes 1004B and 1004C for users at waypoints 600A and 600B respectively.

Figure 10C:
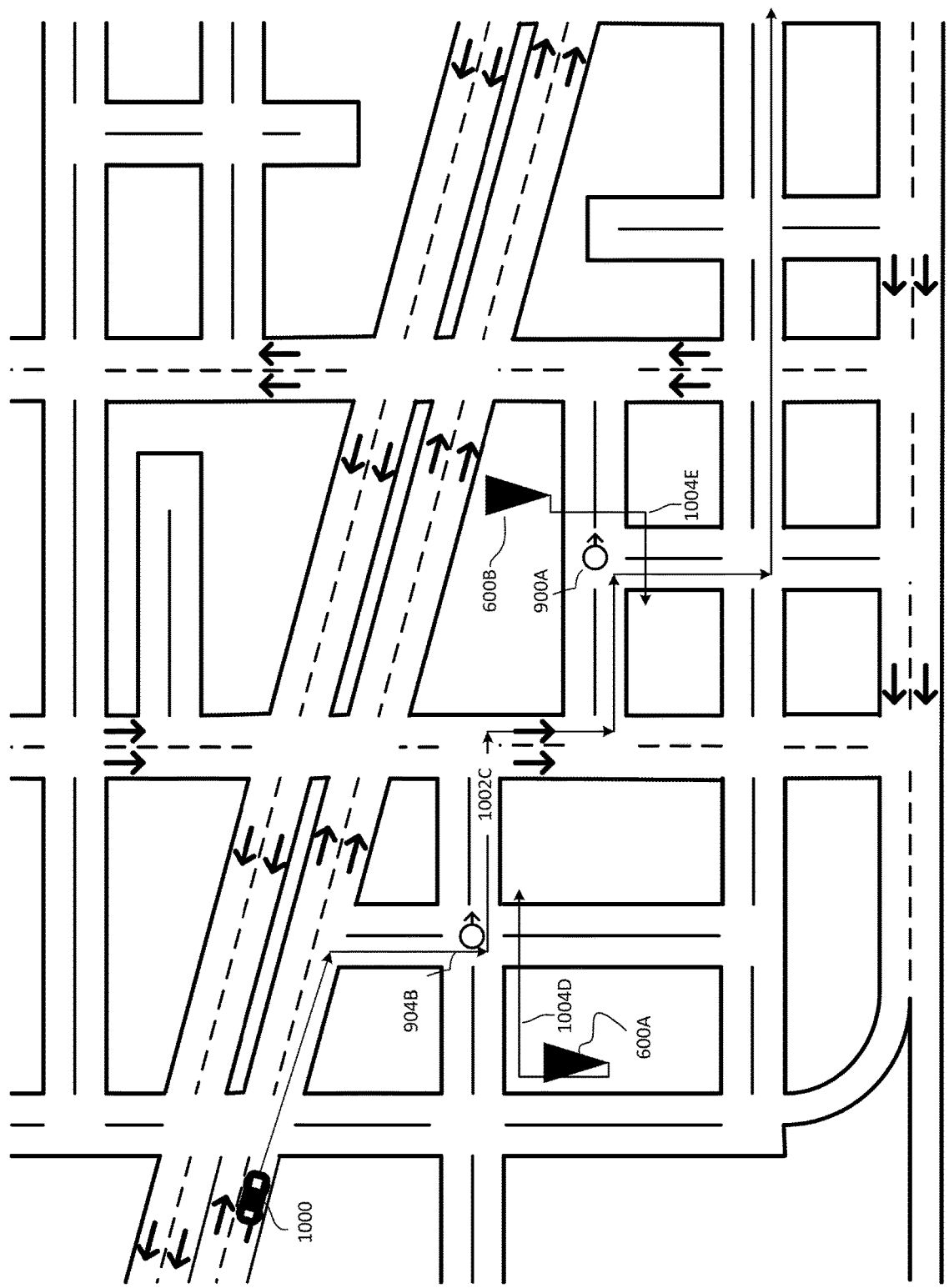
FIG. 10C illustrates a more efficient route for a candidate point combination in accordance with one embodiment.

FIG. 10C illustrates a more efficient route for a candidate point combination in accordance with one embodiment. FIG. 10C shows another route 1002C and walking routes 1004D and 1004E determined for the same waypoint plan this time using a candidate point combination including points 904B and 900A. This route is considerably shorter than the route determined for points 904A and 900B, illustrated in FIG. 10B and, for the purposes of this example, can be considered to have a shorter ETA.

The route determination engine 106 transfers the estimated ETA and other route information 328 to the dynamic routing engine 108, whereby the dynamic routing engine 108 then post-prunes the determined routes 330 to reduce the number of routes for which to estimate a fare and to consider for later selection using post-pruning module 206. Post-pruning typically involves eliminating routes having exceptionally late ETAs by some statistical measure. In some embodiments, outliers are determined for a distribution of ETAs and outliers on the later side of a distribution are eliminated from consideration. In some embodiments, the post-pruning step may also remove routes from consideration based on other heuristics. For example, routes that double back or create loops may be removed from consideration by the dynamic routing engine 108. Referring again to FIGS. 10B and 10C, in either of the above-described embodiments, route 1002B, which has a longer ETA and loops back on itself may be removed from consideration depending on the routes generated using other combinations of the candidate points.

In embodiments where intersection candidate points have associated corner candidate points, the dynamic routing engine 108 may retrieve the corner candidate points associated with the candidate point combinations included in the routes remaining after the route-based post-pruning process. The route determination engine 106 would then calculate a route for each of the new set of corner candidate point combinations. In some embodiments, the second set of resulting routes is then post-pruned before proceeding to fare estimation.

Once all post-pruning steps are complete, the dynamic routing engine 108 requests fare estimates 332, from the fare estimation engine 110, for the routes remaining after the post-pruning steps. The fare estimation engine 110 then determines a fare estimate based on each of the routes 334. The fare estimation engine 110 may estimate a fare using the distance, estimated time of completion for each service request, the estimated ETA or duration of the associated walking routes, or any other feasible characteristic of a route. The fare estimation engine 110 then transfers fare information 336 for each remaining route back to the dynamic routing engine. In some embodiments, the dynamic routing module post-prunes a second time based on the received fare information 338 for the routes. If any of the remaining routes have a statistically high fare, they may be removed from further consideration.

After the optional second post-pruning step, the dynamic routing engine 108 uses route selection module 208 to evaluate 340 and select 342 a route from the remaining routes for a potential service provider. The route selection algorithm is described above with reference to FIG. 2. Once the route selection module 208 has selected a route for each potential service provider for the received service request information for the potential service provider, the route, the ETA for the route, and the fare for the route are transferred 344 to the service provider selection engine 112 for evaluation. The service provider selection engine 112 then selects 348 one or more service providers from the set of potential service providers for the received service request. The algorithm used by the service provider selection engine is described above with reference to FIG. 2. In some embodiments, the service provider selection engine 112 may select all of the potential service providers originally selected by the service provider selection engine 112. In situations where the service provider selection engine 112 selects multiple service providers, the service providers may be ranked in order of estimated ETA for their associated routes. The network system 100 may then notify the service provider of each of the selected service providers that they may accept the route associated with the selected service provider in that order. If a driver of one of the selected service providers accepts the route then no additional service providers are notified.

In some embodiments, the service provider that accepts the service request and determined route for that service provider are reported 350 to the dynamic routing engine 108. In these embodiments, the dynamic routing engine 108 uses the route reevaluation module 210 to periodically retrieve 352 the service provider and route status of the service provider that is carrying out the determined route for the request service request. The route reevaluation module retrieves this data from service provider data 116 and route data 118 to determine whether a set of reevaluation criteria (examples of which are described above) are satisfied. If the drop off reevaluation module 210 determines 354 that the reevaluation criteria are satisfied then steps 316-340 are repeated 356 for only the service provider accommodating the service request.

Figure 11:
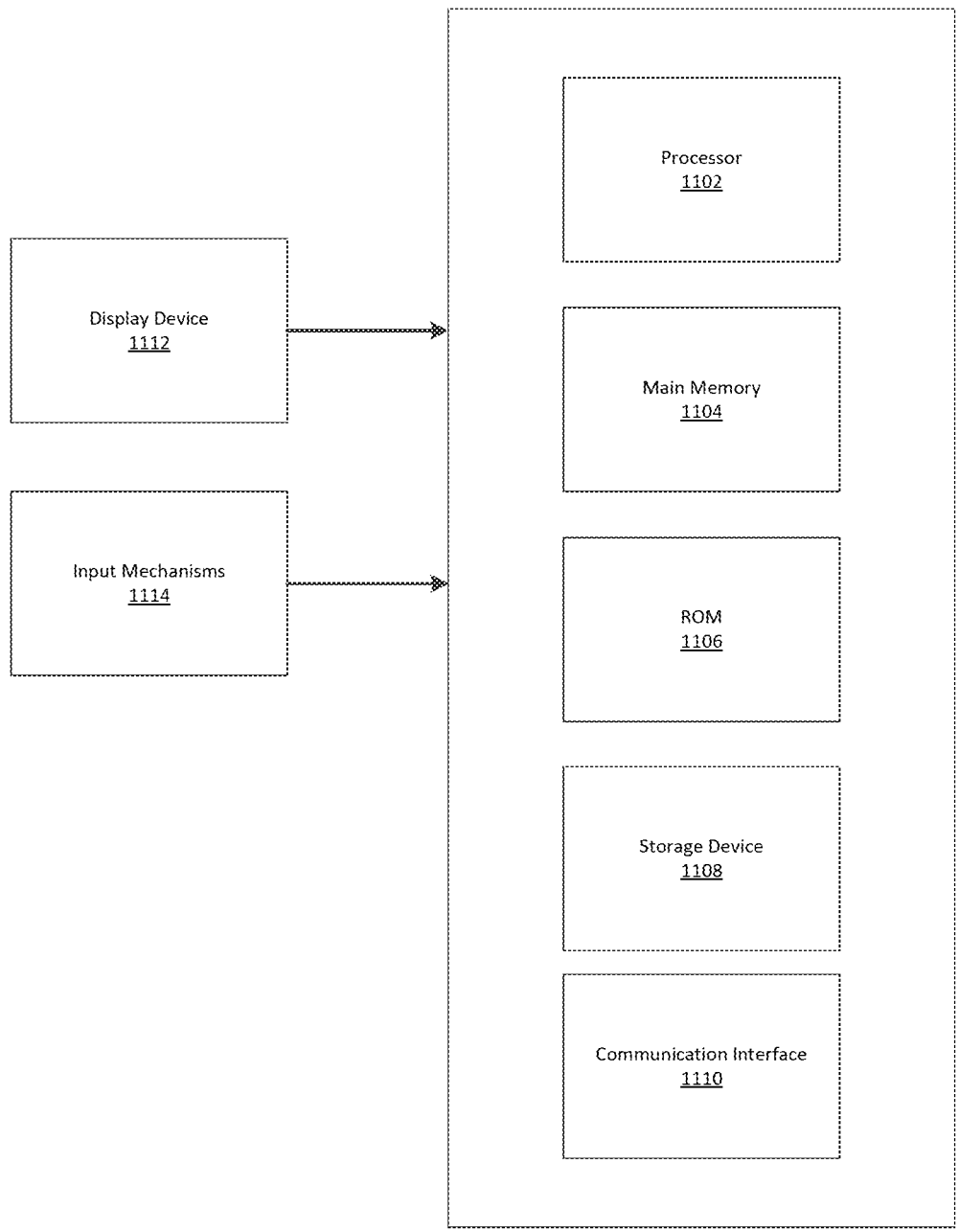
FIG. 11 is a block diagram illustrating an example of a computer system upon which described embodiments may be implemented.

FIG. 11 is a diagram illustrating a computer system upon which embodiments described herein may be implemented. For example, in the context of FIGS. 1 and 2, network system 100 may be implemented using a computer system such as described by FIG. 11. Network system 100 may also be implemented using a combination of multiple computer systems as described by FIG. 11, with each computer system implementing one or more of the components of network system 100. Multiple-computer-systems implementations include networked systems, such as a networked client-server system.

In one implementation, network system 100 includes processing resources such as one or more processors 1102, as well as main memory 1104, read only memory (ROM) 1106, a storage device 1108, and a communication interface 1110. Network system 100 includes the processor(s) 1102 for processing information and main memory 1104, such as a random access memory (RAM) or other dynamic storage device, for storing information and instructions to be executed by the processor(s) 1102. Main memory 1104 also may be used for storing temporary variables or other intermediate information during execution of instructions to be executed by processor(s) 1102. Network system 100 may also include ROM 1106 or other static storage device for storing static information and instructions for processor(s) 1102.

The storage device 1108, such as a magnetic disk or optical disk, is provided for storing information and instructions. The communication interface 1110 can enable network system 100 to communicate with one or more networks (e.g., cellular network) through use of the network link (wireless or wireline). Using the network link, network system 100 can communicate with one or more computing devices, and one or more servers. In an example embodiment, the communication interface 1110 is configured to communicate with a plurality of mobile computational devices associated with users of the network system and drivers in the network system.

In some variations, network system 100 can be configured to receive sensor data (e.g., such as GPS data) from one or more location tracking devices via the network link. The sensor data can be processed by the processor 1102 and can be stored in, for example, the storage device 1108. The processor 1102 can process the sensor data of a location tracking device in order to determine the path of travel of a service provider corresponding to the location tracking device. Extrapolated position information can be transmitted to one or more mobile devices over the network to enable the user and driver applications running on the mobile devices to use the position information to present a visualization of the actual movement of the network service providers.

Network system 100 can also include a display device 1112, such as a cathode ray tube (CRT), an LCD monitor, or a television set, for example, for displaying graphics and information to a user. An input mechanism 1114, such as a keyboard that includes alphanumeric keys and other keys, can be coupled to network system 100 for communicating information and command selections to processor(s) 1102. Other non-limiting, illustrative examples of input mechanisms 1114 include a mouse, a trackball, touch-sensitive screen, or cursor direction keys for communicating direction information and command selections to processor(s) 1102 and for controlling cursor movement on display device 1112.

In an example embodiment, storage device 1108 stores candidate point data 114, service provider data 116, active route data 118, and map data 120. Additionally, the storage device 1108 stores the computational components of FIGS. 1 and 2 as computer executable instructions. During operation, the processor(s) 1102 executes the instructions and loads the components into main memory 1104. The instructions cause the processor(s) 1102 to perform the method of FIGS. 3A-3D. In this way, the processor(s) 1102 coupled to main memory 1104, read only memory (ROM) 1106, storage device 1108, and communication interface 1110 (as described below in greater detail) is a special-purpose processor.

Examples described herein are related to the use of network system 100 for implementing the techniques described herein. According to one embodiment, those techniques are performed by network system 100 in response to processor(s) 1102 executing one or more sequences of one or more instructions contained in main memory 1104. Such instructions may be read into main memory 1104 from another machine-readable medium, such as storage device 1108. Execution of the sequences of instructions contained in main memory 1104 causes processor(s) 1102 to perform the process steps described herein. In alternative implementations, hard-wired circuitry may be used in place of or in combination with software instructions to implement examples described herein. Thus, the examples described are not limited to any specific combination of hardware circuitry and software.

In addition to the embodiments specifically described above, those of skill in the art will appreciate that the invention may additionally be practiced in other embodiments.

Within this written description, the particular naming of the components, capitalization of terms, the attributes, data structures, or any other programming or structural aspect is not mandatory or significant unless otherwise noted, and the mechanisms that implement the described invention or its features may have different names, formats, or protocols. Further, the system may be implemented via a combination of hardware and software, as described, or entirely in hardware elements. Also, the particular division of functionality between the various system components described here is not mandatory; functions performed by a single module or system component may instead be performed by multiple components, and functions performed by multiple components may instead be performed by a single component. Likewise, the order in which method steps are performed is not mandatory unless otherwise noted or logically required. It should be noted that the process steps and instructions of the present invention could be embodied in software, firmware or hardware, and when embodied in software, could be downloaded to reside on and be operated from different platforms used by real time network operating systems.

Algorithmic descriptions and representations included in this description are understood to be implemented by computer programs. Furthermore, it has also proven convenient at times, to refer to these arrangements of operations as modules or code devices, without loss of generality.

Unless otherwise indicated, discussions utilizing terms such as "selecting" or "computing" or "determining" or the like refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented are not inherently related to any particular computer or other apparatus. Various general-purpose systems may also be used with programs in accordance with the teachings above, or it may prove convenient to construct more specialized apparatus to perform the required method steps. The required structure for a variety of these systems will appear from the description above. In addition, a variety of programming languages may be used to implement the teachings above.

Finally, it should be noted that the language used in the specification has been Bean principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer-implemented method for selecting a route using a waypoint plan selection, the method comprising:
storing a plurality of waypoint plans, wherein each waypoint plan indicates a set of waypoints to be traversed;
for each of the plurality of waypoint plans:
determining a directionality component for each waypoint indicated by the waypoint plan based on a location of a subsequent waypoint in the waypoint plan;
retrieving one or more associated candidate points for each waypoint, wherein each candidate point is proximate to the waypoint and has a directionality based on the directionality component of the waypoint;
generating one or more candidate point combinations, wherein each candidate point combination includes one or more candidate points each associated with a waypoint in the waypoint plan; and
for each of the one or more candidate point combinations, determining a route that passes through each candidate point in the candidate point combination; and
selecting a route, of the determined routes, based on one or more characteristics of the routes.

2. The method of claim 1, further comprising:
generating the plurality of waypoint plans, wherein one waypoint plan of the plurality of waypoint plans includes an origin location and destination location pair that is interrupted by other waypoints and a second waypoint plan of the plurality of waypoint plans includes an origin location and destination location pair that are not placed consecutively at a beginning or end of the waypoint plan.

3. The method of claim 1, further comprising:
applying a haversine distance filter to at least one of the plurality of waypoint plans to create a set of filtered waypoint plans, wherein the haversine distance filter compares a sum of haversine distances between the waypoints in a waypoint plan in an order specified by the waypoint plan to a sum of haversine distances of individual trips within the waypoint plan.

4. The method of claim 3, wherein applying the haversine distance filter further comprises:
identifying origin location and destination location pairs in a waypoint plan;
calculating an individual sum of haversine distances between each identified origin location and destination location pair;
calculating a plan sum of haversine distances between waypoints in each waypoint plan in an order specified by the waypoint plan;
calculating a plan ratio for each waypoint plan by dividing the plan sum for the waypoint plan by the individual sum for the waypoint plan; and
for each of the at least one waypoint plans, responsive to determining that the calculated plan ratio for the waypoint plan exceeds a predetermined threshold ratio, excluding that waypoint plan from the filtered waypoint plans.

5. The method of claim 1, wherein determining a directionality component for each waypoint further comprises:
responsive to determining that a waypoint is not last in the waypoint plan:
calculating a heading angle between the waypoint and the subsequent waypoint in the waypoint plan; and
setting the directionality component of the waypoint equal to the calculated heading angle.

6. The method of claim 1, wherein candidate points are locations corresponding to potential start and end locations to be included in a route, and wherein each candidate point is associated with a corner of an intersection of at least two roads.

7. The method of claim 1, wherein candidate points are locations corresponding to potential start and end locations to be included in a route, and wherein each candidate point is associated with an intersection of at least two roads.

8. The method of claim 7, further comprising, pruning the determined routes based on characteristics of the determined routes to create a pruned set of routes for an active vehicle.

9. The method of claim 8, further comprising, for each of the pruned set of routes:
retrieving a second set of candidate points;
generating a second set of candidate point combinations, each candidate point combination including candidate points from the second set of candidate points; and
determining a route for each of the second set of candidate point combinations.

10. The method of claim 1, further comprising:
determining a fare for each of the determined routes; and
selecting a route corresponding to each potential vehicle based on the determined fares.

11. The method of claim 1, further comprising:
periodically retrieving route information and vehicle information for the selected route; and
reevaluating the selected route for an active vehicle based on waypoints remaining in the selected route.

12. A computer program product for selecting a route using a waypoint plan selection, the computer program product stored on a non-transitory computer readable medium and including instructions configured to cause one or more processors to execute steps comprising:
storing a plurality of waypoint plans, wherein each waypoint plan indicates a set of waypoints to be traversed;
for each of the plurality of waypoint plans:
determining a directionality component for each waypoint indicated by the waypoint plan based on a location of a subsequent waypoint in the waypoint plan;
retrieving one or more associated candidate points for each waypoint, wherein each candidate point is proximate to the waypoint and has a directionality based on the directionality component of the waypoint;
generating one or more candidate point combinations, wherein each candidate point combination includes one or more candidate points each associated with a waypoint in the waypoint plan; and
for each of the one or more candidate point combinations, determining a route that passes through each candidate point in the candidate point combination; and
selecting a route, of the determined routes, based on one or more characteristics of the routes.

13. The computer program product of claim 12, further comprising:

generating the plurality of waypoint plans, wherein one waypoint plan of the plurality of waypoint plans includes an origin location and destination location pair that is interrupted by other waypoints and a second waypoint plan of the plurality of waypoint plans includes an origin location and destination location pair that are not placed consecutively at a beginning or end of the waypoint plan.

14. The computer program product of claim 12, further comprising:

applying a haversine distance filter to at least one of the plurality of waypoint plans to create a set of filtered waypoint plans, wherein the haversine distance filter compares a sum of haversine distances between the waypoints in a waypoint plan in an order specified by the waypoint plan to a sum of haversine distances of individual trips within the waypoint plan.

15. The computer program product of claim 14, wherein applying the haversine distance filter further comprises:

identifying origin location and destination location pairs in a waypoint plan;

calculating an individual sum of haversine distances between each identified origin location and destination location pair;

calculating a plan sum of haversine distances between waypoints in each waypoint plan in an order specified by the waypoint plan;

calculating a plan ratio for each waypoint plan by dividing the plan sum for the waypoint plan by the individual sum for the waypoint plan; and for each of the at least one waypoint plans, responsive to determining that the calculated plan ratio for the waypoint plan exceeds a predetermined threshold ratio, excluding that waypoint plan from the filtered waypoint plans.

16. The computer program product of claim 12, wherein determining a directionality component for each waypoint further comprises:

responsive to determining that a waypoint is not last in the waypoint plan:

calculating a heading angle between the waypoint and the subsequent waypoint in the waypoint plan; and setting the directionality component of the waypoint equal to the calculated heading angle.

17. The computer program product of claim 12, wherein candidate points are locations corresponding to potential start and end locations to be included in a route, and wherein each candidate point is associated with a corner of an intersection of at least two roads.

18. The computer program product of claim 12, wherein candidate points are locations corresponding to potential start and end locations to be included in a route, and wherein each candidate point is associated with an intersection of at least two roads.

19. The computer program product of claim 18, further comprising, pruning the determined routes based on characteristics of the determined routes to create a pruned set of routes for an active vehicle.

20. The computer program product of claim 19, further comprising, for each of the pruned set of routes:

retrieving a second set of candidate points;

generating a second set of candidate point combinations, each candidate point combination including candidate points from the second set of candidate points; and determining a route for each of the second set of candidate point combinations.

* * * * *